(12) United States Patent
Yamamoto et al.

(10) Patent No.: US 7,031,386 B2
(45) Date of Patent: Apr. 18, 2006

(54) IMAGE TRANSMITTER

(75) Inventors: Akihiro Yamamoto, Osaka (JP); Susumu Ibaraki, Sakai (JP); Toshiaki Mori, Mino (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 444 days.

(21) Appl. No.: 09/953,974

(22) Filed: Sep. 18, 2001

(65) Prior Publication Data

US 2002/0048322 A1 Apr. 25, 2002

(30) Foreign Application Priority Data

Sep. 19, 2000 (JP) ............... 2000-283015

(51) Int. Cl.
*H04N 7/12* (2006.01)
*H04B 1/66* (2006.01)

(52) U.S. Cl. ................................ 375/240.12

(58) Field of Classification Search .......... 375/240.01, 375/240.02, 240.09, 240.12, 240.13, 240.15, 375/240.16, 240.25, 240.26; 348/152, 153, 348/154, 158, 160, 400.1, 401.1, 384.1; 382/232, 382/250, 248, 233; 360/48; 380/113; 370/476; H04N 7/12; H04B 1/66
See application file for complete search history.

(56) References Cited

U.S. PATENT DOCUMENTS

| 4,805,017 | A | * | 2/1989 | Kaneko et al. .......... 348/401.1 |
| 5,051,988 | A | * | 9/1991 | Kawahigashi et al. ...... 370/476 |
| 5,103,306 | A | * | 4/1992 | Weiman et al. .......... 348/400.1 |
| 5,212,549 | A | * | 5/1993 | Ng et al. ............... 375/240.15 |

(Continued)

FOREIGN PATENT DOCUMENTS

EP 0 586 225 3/1994

(Continued)

OTHER PUBLICATIONS

El-Maleh, A. et al.: "A Comparison of One- and Two-dimensional Vector Quantization of Images" IEEE Pacific Rim Conference On Communications, Computers and Signal Processing, 1991., Victoria, BC, Canada, May 9-10, 1991, New York, NY, pp. 490-493, XP010039505.

(Continued)

*Primary Examiner*—Tung Vo
(74) *Attorney, Agent, or Firm*—Wenderoth, Lind & Ponack, L.L.P.

(57) ABSTRACT

A transmitter is capable of compressing an incoming image with a relatively small delay time and transmit the compressed image data to a receiver. Image data contains at least i pixel values of pixels arranged in line along a single direction, each pixel value being expressed in n bits. A transmitter for compressing such image data and transmitting the image data to a receiver via a transmission path includes a blocking section, a data compression section, and a data sending section. The blocking section takes every p pixel values among the i pixel values in the image data to form a data block, and sequentially outputs a plurality of the data blocks each including the p pixel values. The data compression section reduces an amount of data from each data block outputted from the blocking section and thereby outputs a compressed block. The data sending section sends the compressed block outputted from the data compression section onto the transmission path.

12 Claims, 28 Drawing Sheets

U.S. PATENT DOCUMENTS

| | | | | |
|---|---|---|---|---|
| 5,243,428 | A | 9/1993 | Challapali et al. | |
| 5,272,527 | A * | 12/1993 | Watanabe | 348/154 |
| 5,281,079 | A | 1/1994 | Lemelson | |
| 5,424,778 | A | 6/1995 | Sugiyama et al. | |
| 5,432,555 | A | 7/1995 | Park | |
| 5,502,491 | A | 3/1996 | Sugiyama et al. | |
| 5,631,744 | A * | 5/1997 | Takeuchi et al. | 382/250 |
| 5,659,362 | A * | 8/1997 | Kovac et al. | 348/384.1 |
| 5,670,935 | A | 9/1997 | Schofield et al. | |
| 5,684,536 | A | 11/1997 | Sugiyama et al. | |
| 5,737,481 | A * | 4/1998 | Gushima et al. | 386/113 |
| 5,805,293 | A * | 9/1998 | Mochizuki | 382/248 |
| 5,926,210 | A * | 7/1999 | Hackett et al. | 348/158 |
| 5,995,241 | A * | 11/1999 | Nakatani et al. | 382/250 |
| 6,124,995 | A * | 9/2000 | Kim | 360/48 |
| 6,850,647 | B1 * | 2/2005 | Gough et al. | 382/233 |
| 2004/0085447 | A1 | 5/2004 | Katta et al. | |

FOREIGN PATENT DOCUMENTS

| | | |
|---|---|---|
| EP | 0 862 138 | 9/1998 |
| EP | 0 949 818 | 10/1999 |
| JP | 7-280911 | 10/1995 |
| JP | 8-102953 | 4/1996 |
| JP | 9-130787 | 5/1997 |
| WO | 88/10544 | 12/1988 |
| WO | 96/38319 | 12/1996 |

OTHER PUBLICATIONS

Sun, H. et al.: "Error Concealment Algorithms for Robust Decoding of MPEG Compressed Video" Signal Processing: Image Communicaton, Elsevier Science Publishers, Amsterdam, NL, vol. 10, No. 4, 1997, pp. 249-268, XP004091243.

Habibi, A., "Comparison of Nth-Order DPCM Encoder with Linear Transformations and Block Quantization Techniques" IEEE Transactions on Communication Technology, IEEE Inc., New York, US, vol. COM-19, No. 6, Dec. 1971, pp. 948-956. XP000915313.

Habibi, A., "Survey of Adaptive Image Coding Techniques" IEEE Transactions on Communications, IEEE Inc., New York, US, vol. COM-25, No. 11, Nov. 1977, pp. 1275-1284. XP000907678.

Wakita, Y. et al., "Application of Intelligent Monitoring for Super Long Distance Teleoperation" Intelligent Robots and Systems '96, IROS 96, Proceedings of the 1996 LEEE/RSJ International Conference on Osaka, Japan, Nov. 4-8, 1996, New York, NY, USA, IEEE, pp. 1031-1037. XP010212552.

McCain, H. G. et al., "Flight Telerobotic Servicer: The Design and Evolution of a Dexterous Space Telerobot" Proceedings of the National Telesystems Conference, Atlanta, Mar. 26, 1991, vol. 1, pp. 385-390. XP010047059.

* cited by examiner

| BIT PATTERN $BP_w$ | REFERENCE BIT POSITION $RBL_w$ | LEVEL VALUE $LV_y$ |
|---|---|---|
| $BP_1$ | $RBL_1$ | $LV_1$ |
| $BP_2$ | $RBL_2$ | $LV_2$ |
| ⋮ | ⋮ | ⋮ |
| $BP_t$ | $RBL_t$ | $LV_t$ |
| $BP_{t+1}$ | $RBL_{t+1}$ | $LV_{t+1}$ |
| ⋮ | ⋮ | |
| $BP_n$ | $RBL_n$ | |

F I G. 1 2
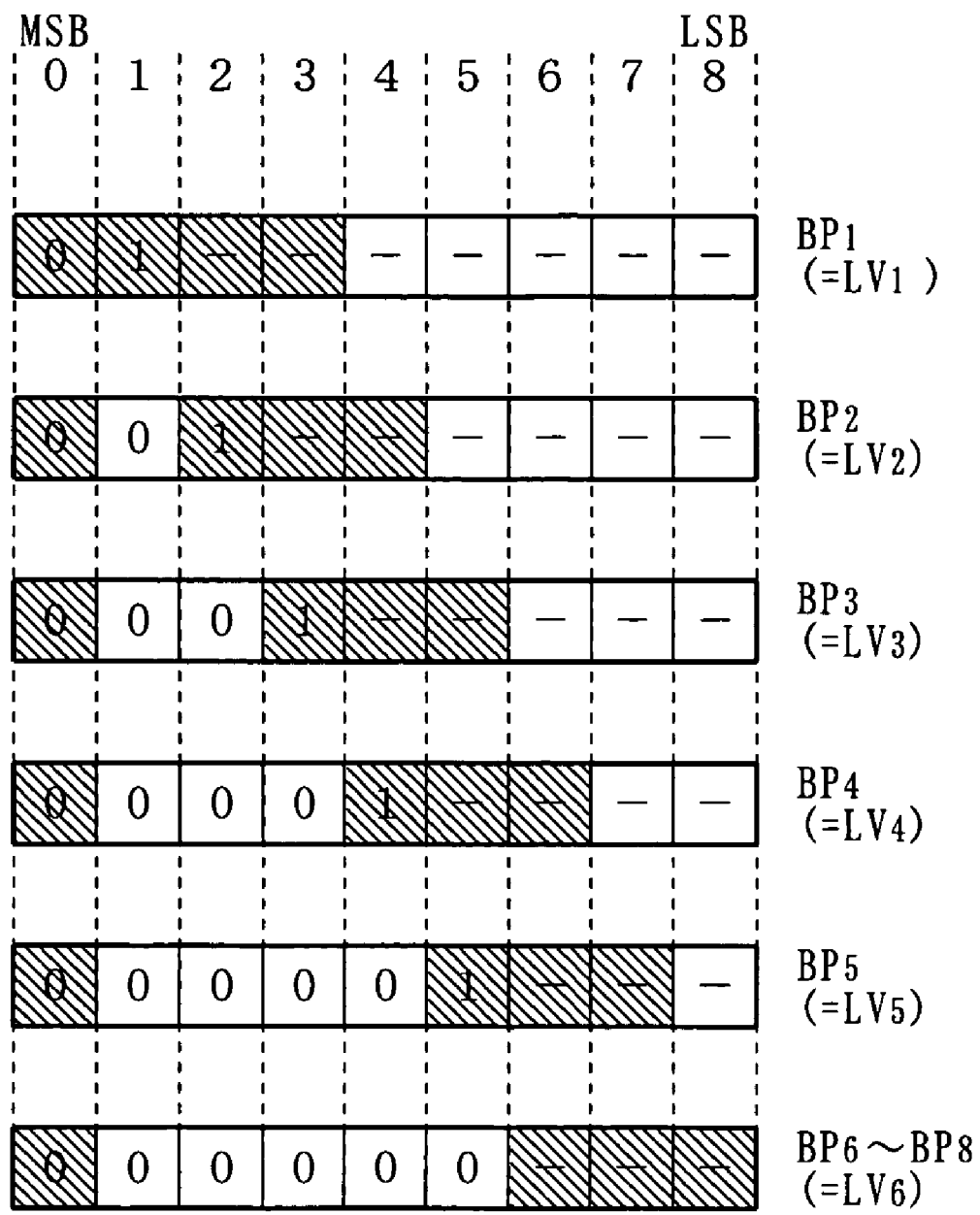

FIG. 29

| MSB | | | | | | | LSB | |
|---|---|---|---|---|---|---|---|---|
| 0 | 1 | 2 | 3 | 4 | 5 | 6 | 7 | 8 |

| | 1 | 1 | 1 | 1 | 1 | 1 | | | CF16xr-12, CF16xr-11 (+) |
| | 0 | 0 | 0 | 0 | 0 | 0 | | | CF16xr-12, CF16xr-11 (−) |
| | 1 | 1 | 1 | 1 | 1 | | | | CF16xr-10, CF16xr-9 (+) |
| | 0 | 0 | 0 | 0 | 0 | | | | CF16xr-10, CF16xr-9 (−) |

IMAGE TRANSMITTER

BACKGROUND OF THE INVENTION

1. Field of the Invention

The present invention relates to an image transmitter, and more specifically to an image transmitter for compressing incoming image data and transmitting the compressed image data to a receiver via a transmission path.

2. Description of the Background Art

Examples of conventional image compression schemes are the MPEG (Motion Picture Experts Group) scheme and the DVC (Digital Video Cassette) scheme. According to these image compression schemes, incoming image data is subjected to DCT (Discrete Cosine Transform) and variable-length coding on a macro block-by-macro block basis, whereby a high compression rate for the image data may be realized. An implementation example of such an image compression scheme is a moving picture encoder which is disclosed in Japanese Patent Laid-Open Publication No. 7-280911.

However, after the aforementioned moving picture encoder receives one line of pixels arranged along a horizontal direction within an image to be processed, the moving picture encoder may also receive a next line of pixels. As a result, before all of the pixels which compose one macro block are received, the moving picture encoder may receive a number of pixels which are unrelated to that macro block. The receipt of such unnecessary pixels causes a delay time associated with compression processing in conventional moving picture encoders.

SUMMARY OF THE INVENTION

Therefore, an object of the present invention is to provide a transmitter which is capable of compressing an incoming image for transmission to a receiver with a relatively small delay time.

The present invention has the following features to attain the object above. According to one aspect of the invention, there is provided an image transmitter for compressing image data and transmitting the image data to a receiver via a transmission path, wherein the image data at least contains i pixel values of pixels arranged in line along a single direction, each pixel value being expressed in n bits, the image transmitter comprising: a blocking section for taking every p pixel values among the i pixel values in the image data to form a data block, and sequentially outputting a plurality of the data blocks each including the p pixel values; a data compression section for reducing an amount of data from each data block outputted from the blocking section to output a compressed block; and a data sending section for sending the compressed block outputted from the data compression section onto the transmission path, wherein i, n, and p are predetermined natural numbers.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram illustrating an exemplary relationship between the level values $LV_1$ to $LV_{t+1}$ shown in FIG. 10 and the bits to be deleted from the differential data $DD_{p\times(r-1)+2}$ to $DD_{p\times r}$;

FIG. 29 is a diagram illustrating the rest of the process performed by the data reduction section 27 shown in FIG. 26;

DESCRIPTION OF THE PREFERRED EMBODIMENTS

Figure 1:
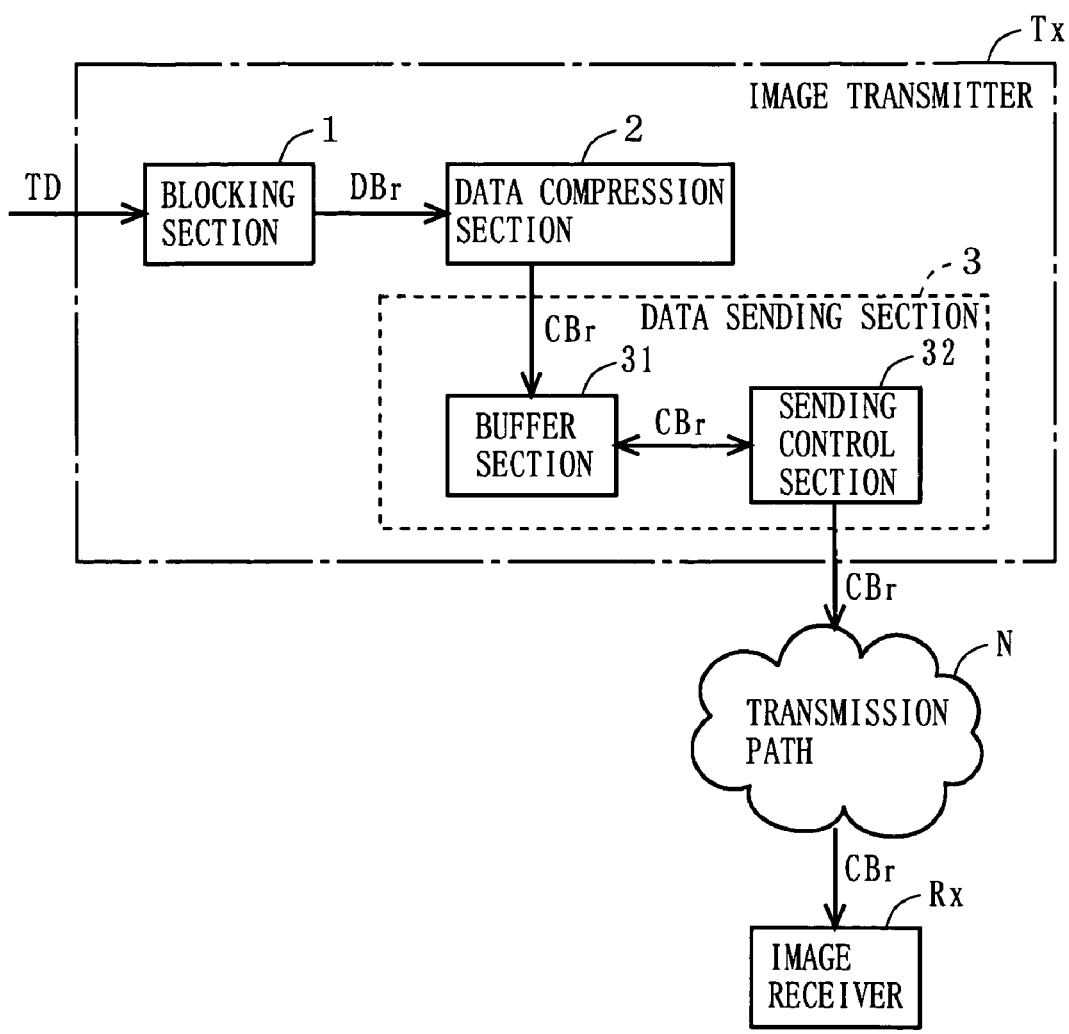
FIG. 1 is a block diagram illustrating a structure of an image transmitter Tx according to one embodiment of the present invention.

FIG. 1 is a block diagram illustrating an overall structure of an image transmitter Tx according to one embodiment of the present invention. As shown in FIG. 1, the image transmitter Tx is constructed so as to be capable of data communication with a receiver Rx via a transmission path N, and includes a blocking section 1, a data compression section 2, and a data sending section 3. The transmission path N may be wired or wireless.

Figure 2A:
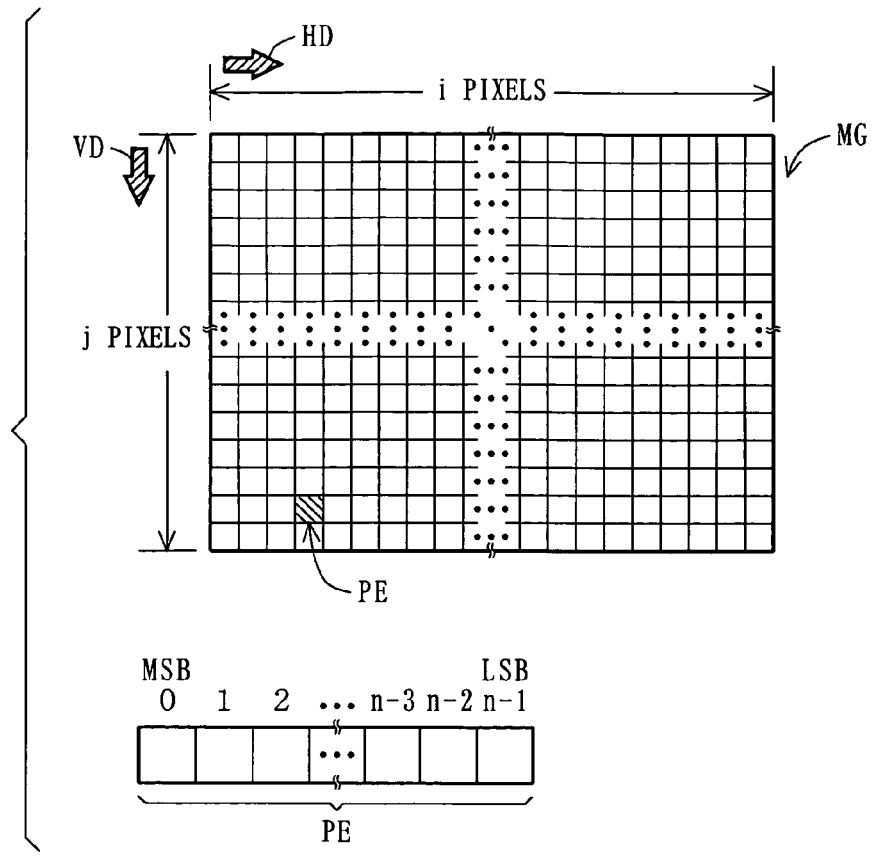
FIGS. 2A and 2B are diagrams illustrating an image MG represented by image data TD which is received by a blocking section 1 shown in FIG. 1.

The blocking section 1 receives image data TD to be processed. As shown in FIG. 2A, the image data TD typically represents one frame of image MG. In FIG. 2A, the image MG is composed of (i×j) pixels PE. Herein, "i" and "j" are predetermined natural numbers, which in the present embodiment are assumed to be 640 and 480, respectively. More specifically, the image MG has a width equal to i pixels PE along a width (horizontal) direction HD. The image MG has a length equal to j pixels PE along a longitudinal (vertical) direction VD, the longitudinal direction VD running perpendicular to the width direction HD. Although only one pixel PE (a rectangular region which is shown hatched) is labeled as "PE" in FIG. 2A for conciseness, it will be appreciated that each rectangular region in the image MG represents a pixel PE. FIG. 2A also shows that the value of each pixel PE is expressed in an n-bit binary format. Herein, "n" is a predetermined natural number, which in the present embodiment is assumed to be 8. In the following description, the value of each pixel PE will be referred to as a "pixel value XV".

Figure 2B:
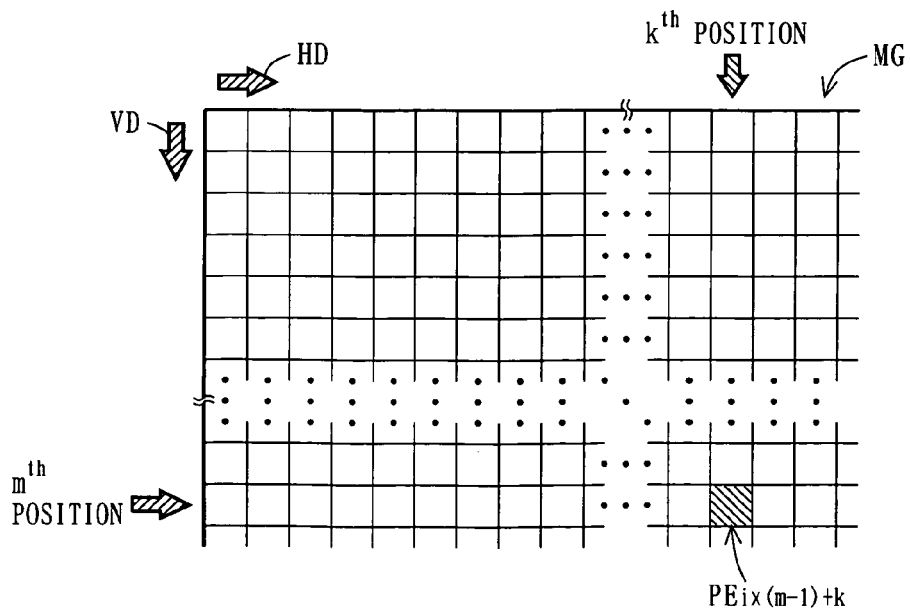

As shown in FIG. 2B, a pixel PE in the image MG which is located at a $k^{th}$ position along the width direction HD and at an $m^{th}$ position along the longitudinal direction VD will conveniently be expressed as a "pixel $PE_{j\times(m-1)+k}$", whose value will be expressed as a "pixel value $XV_{j\times(m-1)+k}$". Herein, "k" is a natural number such that $1 \leq k \leq i$; and "m" is a natural number such that $1 \leq m \leq j$. The suffix "i×(m−1)+k" for the reference numeral "PF" represents an order by which the blocking section 1 receives the respective pixels PE. For example, under the above assumption where the image MG is composed of 640×480 pixels PE, a pixel PE which is located at the first position along the width direction HD and at the first position along the longitudinal direction VD will be represented as a "pixel $PE_1$". Similarly, a pixel PE which is located at the $100^{th}$ position along the width direction HD and at the $121^{st}$ position along the longitudinal direction VD will be represented as a "pixel $PE_{76900}$". Similarly, the last pixel PE, or a pixel which is located at the $640^{th}$ position along the width direction HD and at the $480^{th}$ position along the longitudinal direction VD, will be represented as a "pixel $PE_{307200}$".

Figure 3:
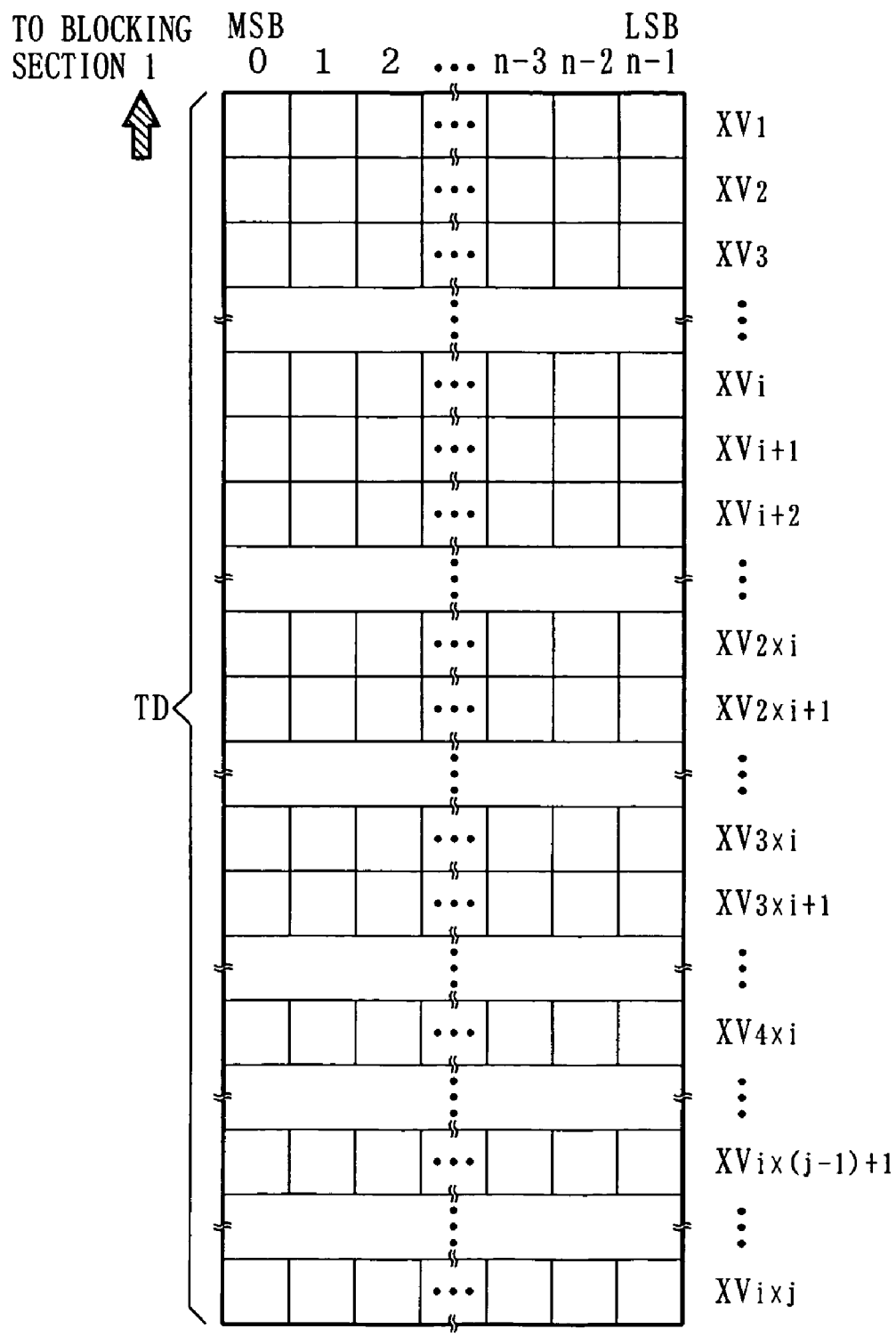
FIG. 3 is a diagram illustrating a format of the image data TD which is received by the blocking section 1 shown in FIG. 1.

As shown in FIG. 3, the image data TD which is received by the blocking section 1 has a format such that the image data TD is composed of (i×j) pixel values $XV_{i\times(m-1)+k}$ (m=1,2, ... j, k=1,2, ... i), that is, the image data TD is a collection of pixel values $XV_1$ to $XV_{i\times j}$. More specifically, in the image data TD, the pixel value $XV_1$ is located at the beginning, immediately followed by a pixel value $XV_2$. In turn, the pixel value $XV_2$ is followed by pixel values $XV_3$ to $XV_i$, which compose the rest of the first line along the width direction HD. Then comes a second line of pixel values $XV_{i+1}$, followed by pixel values $XV_{i+2}$ to $XV_{2\times i}$. Similarly, third, fourth, ..., and $j^{th}$ lines of pixel values $XV_{2\times i+1}$ to $XV_{3\times i}$, pixel values $XV_{3\times i+1}$ to $XV_{4\times i}$, ... and pixel values $XV_{i\times(j-1)+1}$ to $XV_{i\times j}$ respectively follow.

In addition to the pixel values $XV_1$ to $XV_{i\times j}$, the image data TD may contain any other additional information to be used for certain purposes. However, such additional information is not essential for the present embodiment of the invention, and therefore is omitted from the illustration and descriptions.

Figure 4:
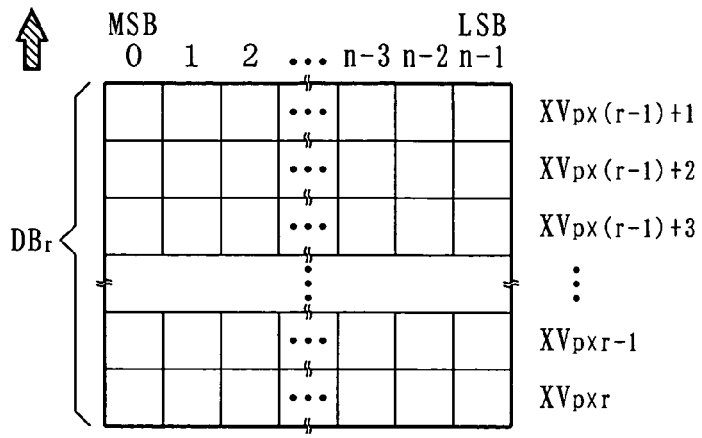
FIG. 4 is a diagram illustrating a format of data block $DB_r$ which is outputted from the blocking section 1 shown in FIG. 1.

In accordance with the aforementioned format of the image data TD, the blocking section 1 receives the pixel values $XV_1$ to $XV_{i\times j}$ in this order. Among the incoming pixel values $XV_1$ to $XV_{i\times j}$, the blocking section 1 takes every p (where p is a predetermined number) pixel values to generate q data blocks DB, each of which is composed of p pixel values. Herein, "p" is a divisor of i, and in the present embodiment is assumed to be 8; and "q" is equal to {(i×j)/p}. Under the above assumptions where i=640, j=480, and p=8, q is 38400. For conciseness, a data block DB which is the $r^{th}$ generated data block will be denoted as a "data block $DB_r$" with a suffix r. Herein, "r" is a natural number such that $1 \leq r \leq q$. As shown in FIG. 4, such a data block $DB_r$ (r=1,2, ... q) will be a collection of p pixel values $XV_{p\times(r-1)+1}$ to $XV_{p\times r}$. Under the above assumptions, the first generated data block $DB_1$ is a collection of pixel values $XV_1$ to $XV_8$, given that r=1. Similarly, the second data block $DB_2$ is composed of pixel values $XV_9$ to $XV_{16}$. The last generated data block $DB_{38400}$ is composed of pixel values XV307192 to $XV_{307200}$. Such data blocks $DB_r$ are outputted from the blocking section 1 to the data compression section 2 in the order in which they are generated (see FIG. 1).

As described in connection with the background art, according to the typical conventional image compression schemes such as the MPEG scheme or the DVC scheme, a number of unnecessary pixels are likely to have been received before all of the pixels composing a macro block are received, giving rise to an unwanted delay time. In contrast, according to the present embodiment of the invention, the blocking section 1 generates a data block $DB_r$ which is composed of p pixel values $XV_1$ to $XV_{i \times j}$ in the order they are received. In other words, the blocking section 1 becomes ready to construct a data block $DB_r$ as soon as it receives p contiguous pixel values XV along the width direction HD, which can then be quickly passed to the next stage, i.e., the data compression section 2. As a result, the delay time can be reduced as compared to the conventional image compression schemes.

The data compression section 2 performs a first or second compression process (described later) for each incoming data block $DB_r$. Thus, the data compression section 2 generates a compressed block $CB_r$ (r=1,2, . . . q) having a fixed length composed of predetermined s bits. Each compressed block $CB_r$ thus generated is outputted from the data compression section 2 to the data sending section 3 (see FIG. 1).

Figure 5:
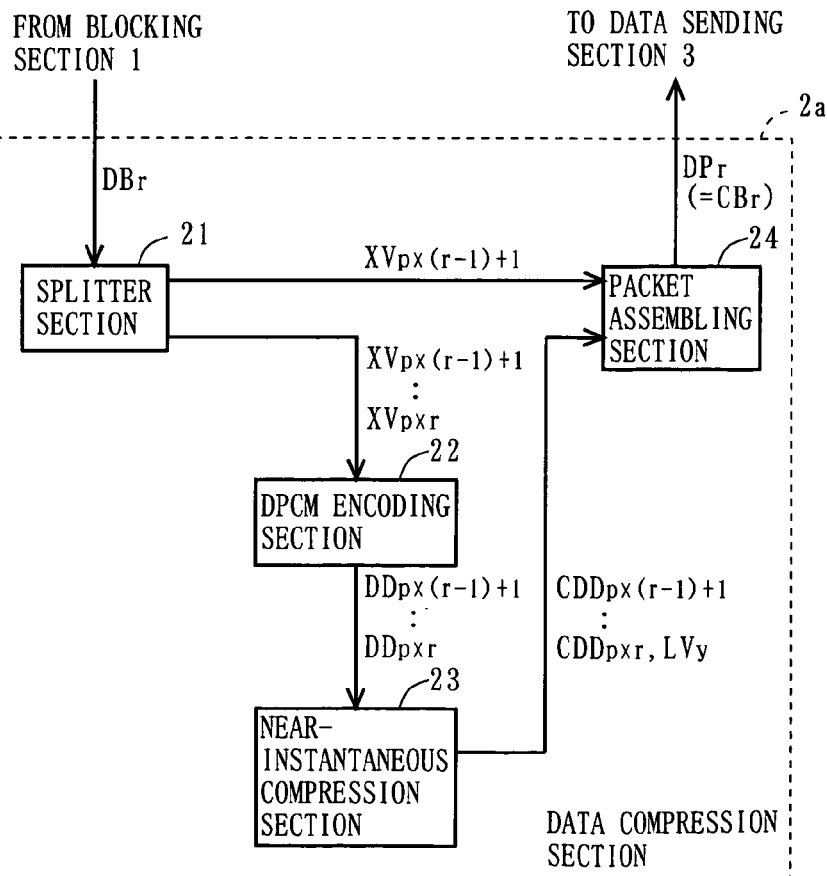
FIG. 5 is a block diagram illustrating a first implementation (a "data compression section 2a") of a data compression section 2 shown in FIG. 1.

Next, with reference to FIGS. 5 to 7, a first exemplary implementation of the data compression section 2 shown in FIG. 1 will be described. In the following description, the first implementation of the data compression section 2 will be referred to as a "data compression section 2a". As shown in FIG. 5, in order to realize the aforementioned first compression process, the data compression section 2a includes a splitter section 21, a DPCM encoding section 22, a near-instantaneous compression section 23, and a packet assembling section 24. As specifically shown in FIG. 6, the DPCM encoding section 22 of FIG. 5 includes a delay section 221 and a subtraction section 222. As specifically shown in FIG. 7, the near-instantaneous compression section 23 shown in FIG. 5 includes a buffer section 231, a level determination section 232, and a data reduction section 233.

Next, the first compression process which is performed by the data compression section 2a having the above-described structure will be specifically described. Data blocks $DB_r$, which are sent from the blocking section 1 (described above) are sequentially received by the splitter section 21 in the data compression section 2a. Each data block $DB_r$ includes an array of p pixel values $XV_{p \times (r-1)+1}$ to $XV_{p \times r}$ (see FIG. 4). As shown in FIG. 6, as each data block $DB_r$ is received, the splitter section 21 outputs the pixel value $XV_{p \times (r-1)+1}$, which is located at the beginning of the received data block $DB_r$, to both the packet assembling section 24 and the delay section 221. Moreover, the splitter section 21 outputs each of the pixel values $XV_{p \times (r-1)+2}$ to $XV_{p \times r-1}$ to both the delay section 221 and the subtraction section 222. Furthermore, the splitter section 21 outputs a $p^{th}$ pixel value $XV_{p \times r}$ to the subtraction section 222.

Figure 6:
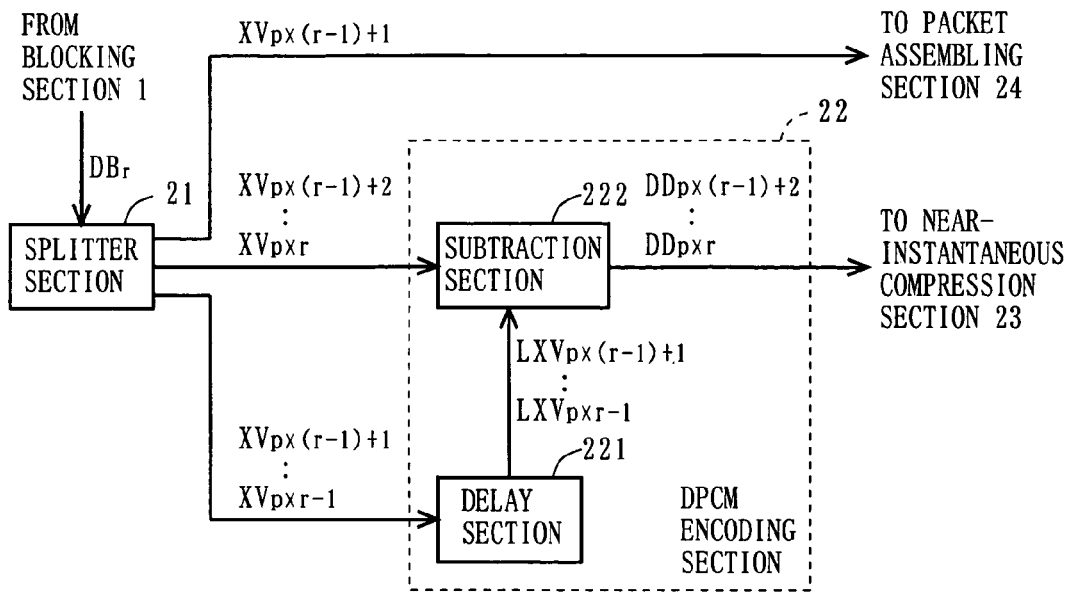
FIG. 6 is a block diagram illustrating the detailed structure of a DPCM encoding section 22 shown in FIG. 5.

As shown in FIG. 6, the DPCM encoding section 22 receives pixel values $XV_{p \times (r-1)+1}$ to $XV_{p \times r}$. The DPCM encoding section 22 performs a differential pulse code modulation (Differential Pulse Code Modulation) to encode each of the received pixel values $XV_{p \times (r-1)+1}$ to $XV_{p \times r}$, thereby generating differential data $DD_{p \times (r-1)+2}$ to $DD_{p \times r}$, which are then outputted to the near-instantaneous compression section 23.

More specifically, the delay section 221 sequentially receives pixel values $XV_{p \times (r-1)+1}$ to $XV_{p \times r-1}$. The delay section 221 applies a delay amount $DL_1$ to the respective received pixel values $XV_{p \times (r-1)+1}$ to $XV_{p \times r-1}$, and outputs the resultant pixel values as delayed pixel values $LXV_{p \times (r-1)+1}$ to $LXV_{p \times r-1}$ to the subtraction section 222. Now, the delay amount $DL_1$ will be specifically described. The subtraction section 222 receives (as described later) pixel values $XV_{p \times (r-1)+2}$ to $XV_{p \times r}$ from the splitter section 21. The delay amount $DL_1$ is prescribed at a value which ensures that the delayed pixel values $LXV_{p \times (r-1)+1}$ to $LXV_{p \times r-1}$ will be received by the subtraction section 222 substantially concurrently with the pixel values $XV_{p \times (r-1)+2}$ to $XV_{p \times r}$. In the present embodiment of the invention, the delay amount $DL_1$ is prescribed to be equal to one clock which defines the operation timing of the DPCM encoding section 22.

Figure 8:
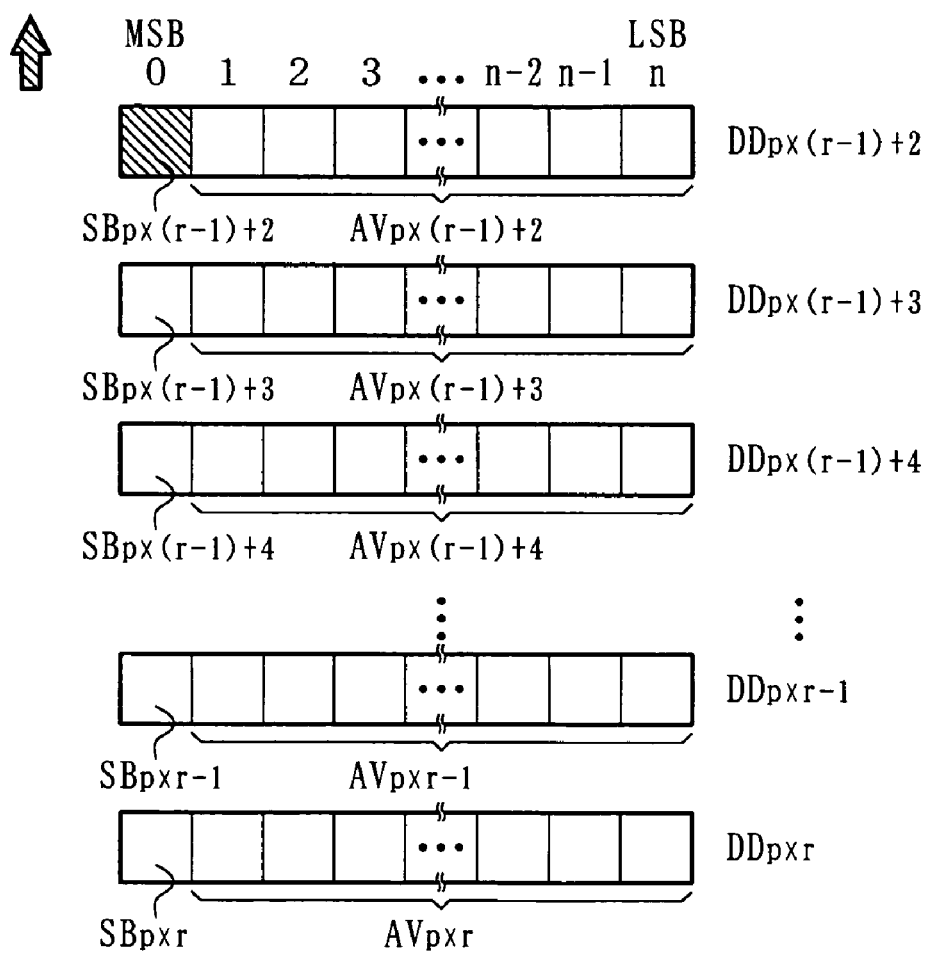
FIG. 8 is a diagram illustrating a format of differential data $DD_{p\times(r-1)+2}$ to $DD_{p\times r}$ which are outputted from the a format of the DPCM encoding section 22 shown in FIG. 5.

The subtraction section 222 receives the pixel values $XV_{p \times (r-1)+2}$ to $XV_{p \times r}$ from the splitter section 21. The subtraction section 222 also receives the delayed pixel values $LXV_{p \times (r-1)+1}$ to $LXV_{p \times r-1}$ from the delay section 221. Note that the aforementioned delay amount $DL_1$ ensures that the delayed pixel value $LXV_{p \times (r-1)+1}$ from the delay section 221 and the pixel value $XV_{p \times (r-1)+2}$ from the splitter section 21 are received by the subtraction section 222 substantially simultaneously. The subtraction section 222 subtracts the currently-received delayed pixel value $LXV_{p \times (r-1)+1}$ from the currently-received pixel value $XV_{p \times (r-1)+2}$ to generate a differential data $DD_{p \times (r-1)+2}$ representing a difference value therebetween. In other words, the subtraction section 222 calculates a difference value between the received pixel value $XV_{p \times (r-1)+2}$ and a preceding pixel value $XV_{p \times (r-1)-1}$ in the image data TD (see FIG. 2B). This difference value may take a positive or negative value. Accordingly, as shown in FIG. 8, a sign bit $SB_{p \times (r-1)+2}$, which is a one-bit expression of the sign (i.e., positive or negative) of the difference value, is added to the differential data $DD_{p \times (r-1)+2}$ as its most significant bit (hereinafter referred to as the "MSB"). In the present embodiment of the invention, it is assumed that the sign bit $SB_{p \times (r-1)+2}$ is "0" when the difference value is positive, and "1" when the difference value is negative. The sign bit $SB_{p \times (r-1)+2}$ is followed by an n-bit expression of the absolute value of the difference value $AV_{p \times (r-1)+2}$ (=|pixel value $XV_{p \times (r-1)+2}$–pixel value $XV_{p \times (r-1)+1}$|). Thus, the differential data $DD_{p \times (r-1)+2}$ is composed of (n+1) bits.

Moreover, the subtraction section 222 subtracts the delayed pixel value $LXV_{p \times (r-1)+2}$ from the concurrently-received pixel value $XV_{p \times (r-1)+3}$ to generate a differential data $DD_{p \times (r-1)+3}$. Thereafter, the subtraction section 222 repeats similar processes until it generates a differential data $DD_{p \times r}$ from the pixel value $XV_{p \times r}$ and the delayed pixel value $LXV_{p \times r-1}$. As can be seen from FIG. 8, the differential data $DD_{p \times (r-1)+3}$ to $DD_{p \times r}$ have a format which is similar to that of the differential data $DD_{p \times (r-1)+2}$. As shown in FIG. 6, the subtraction section 222 sequentially outputs the generated differential data $DD_{p \times (r-1)+2}$ to $DD_{p \times r}$ to the near-instantaneous compression section 23.

As described above, q data blocks $DB_r$ are generated for one frame of image MG, and the DPCM encoding section 22 generates differential data $DD_{p \times (r-1)+2}$ to $DD_{p \times r}$ for each data block $DB_r$. Therefore, the near-instantaneous compression section 23 sequentially receives q sets of differential data $DD_{p \times (r-1)+2}$ to $DD_{p \times r}$. The near-instantaneous compression section 23 generates compressed data $CD_{p \times (r-1)+2}$ to $CD_{p \times r}$ from each set of received differential data $DD_{p \times (r-1)+2}$ to $DD_{p \times r}$, respectively, in accordance with a near-instantaneous compression scheme.

Figure 7:
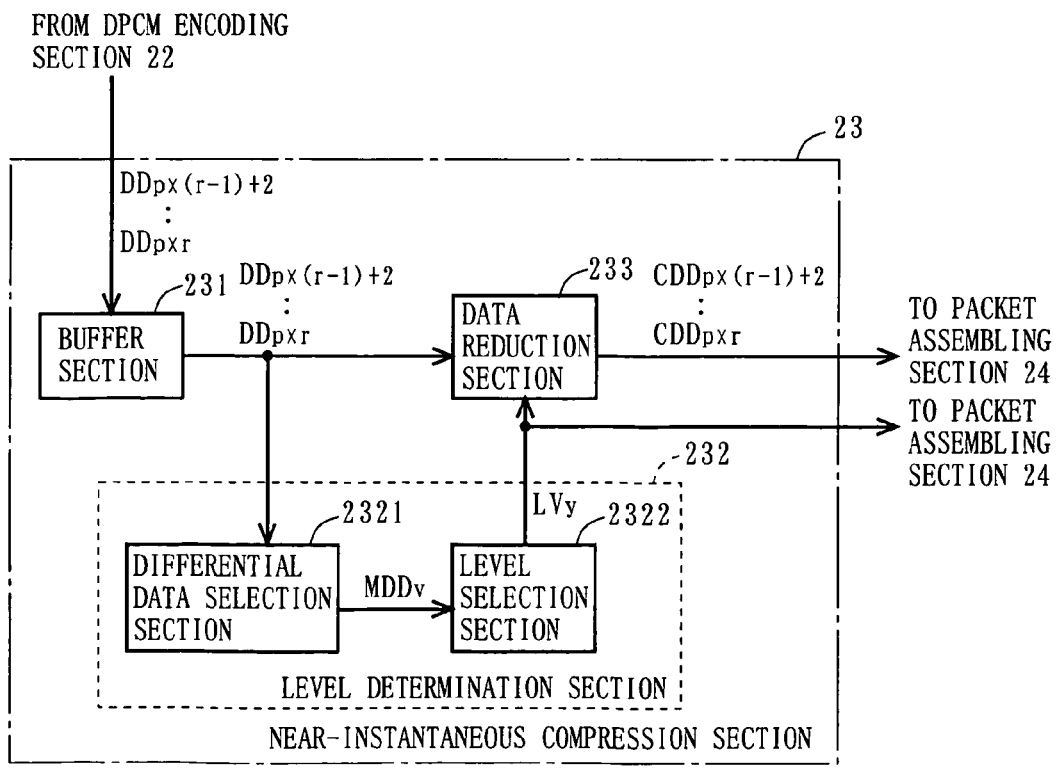
FIG. 7 is a block diagram illustrating the detailed structure of a near-instantaneous compression section 23 shown in FIG. 5.

More specifically, the buffer section 231 shown in FIG. 7, which is constructed so as to be capable of storing (p–1)× (n+1) bits of data, stores the differential data $DD_{p \times (r-1)+2}$ to $DD_{p \times r}$ from the subtraction section 222. The buffer section 231 outputs the stored differential data $DD_{p \times (r-1)+2}$ to $DD_{p \times r}$ to both the level determination section 232 and the data reduction section 233.

The level determination section 232 generates one level value $LV_r$ for every set of differential data $DD_{p \times (r-1)+2}$ to $DD_{p \times r}$ received from the buffer section 231. The data reduction section 233 deletes predetermined t bits from each of the received differential data $DD_{p \times (r-1)+2}$ to $DD_{p \times r}$, as will be described in more detail later. Herein, "t" is a natural number such that $1 \leq t < (n+1)$, and in the present embodiment is assumed to be 5. Stated differently, the data reduction section 233 leaves u bits intact among the (n+1) bits which compose each of the differential data $DD_{p \times (r-1)+2}$ to $DD_{p \times r}$. Herein, "u" is equal to (n+1−t), which under the above assumptions is 4. The level value $LV_r$ specifies the positions of the u bits to be left intact among the (n+1) bits which compose each of the differential data $DD_{p \times (r-1)+2}$ to $DD_{p \times r}$.

In order to derive the aforementioned level value $LV_r$, the level determination section 232 shown in FIG. 7 includes a differential data selection section 2321 and a level selection section 2322. The differential data selection section 2321 receives the differential data $DD_{p \times (r-1)+2}$ to $DD_{p \times r}$ (see FIG. 8) from the buffer section 231. The differential data selection section 2321 selects one of the differential data $DD_{p \times (r-1)+2}$ to $DD_{p \times r}$ having the greatest absolute values $AV_{p \times (r-1)+2}$ to $AV_{p \times r-1}$, and outputs that differential data to the level selection section 2322. In the following description, the differential data which is thus selected by the differential data selection section 2321 will be referred to as the "maximum differential data $MDD_v$". Herein, "v" is a natural number in the range from {p×(r−1)+2} to p×r.

The level selection section 2322 receives the maximum differential data $MDD_v$ from the differential data selection section 2321. The level selection section 2322 determines the sign (i.e., positive or negative) of the received maximum differential data $MDD_v$ based on the value of its sign bit $SB_v$.

Figures 9, 10:
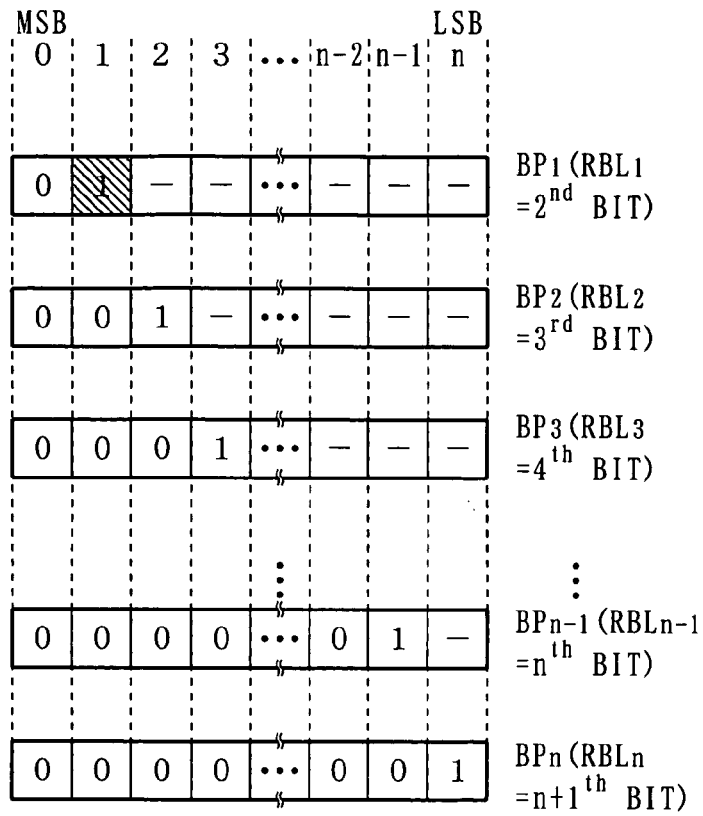
FIG. 9 is a diagram illustrating bit patterns $BP_1$ to $BP_n$ of maximum differential data $MDD_v$ to be selected by a differential data selection section 2321 shown in FIG. 7.
FIG. 10 is a table illustrating the relationship between bit patterns $BP_1$ to $BP_n$ shown in FIG. 9 and level values $LV_1$ to $LV_{t+1}$.

If the current maximum differential data $MDD_v$ has a positive value (i.e., the sign bit $SB_v$ is "0"), then the level selection section 2322 operates in the following manner. Herein, in the case where the sign bit $SB_v$ is "0", the maximum differential data $MDD_v$ has one of n bit patterns $BP_1$ to $BP_n$ as shown in FIG. 9. As shown, the bit pattern $BP_1$ is a bit pattern in which the first instance of "1" appears next to the sign bit $SB_v$, i.e., at the second bit from the MSB. Similarly, the bit patterns $BP_2$ to $BP_n$ are bit patterns in which the first instance of "1" appears at the third to $(n+1)^{th}$ bits from the MSB, respectively. In FIG. 9, any bit shown by the symbol "−" may take either "0" or "1". In the following description, in the positive maximum differential data $MDD_v$, the bit position at which the first instance of "1" appears (i.e., one of the second to the $(n+1)^{th}$ bits), as counted from the MSB, will be referred to as a "reference bit position" $RBL_1$ to $RBL_n$.

In the present embodiment of the invention, as shown in FIG. 10, (t+1) level values $LV_1$ to $LV_{t+1}$ are previously assigned to the bit patterns $BP_1$ to $BP_n$ in the following manner. As described above, "t" represents the number of bits to be deleted from each of the differential data $DD_{p \times (r-1)+2}$ to $DD_{p \times r}$, which in the present embodiment is assumed to be 5. Specifically, level values $LV_1$ to $LV_t$ are assigned to the bit patterns $BP_1$ to $BP_t$, respectively. The same level value $LV_{t+1}$ is assigned to all of the bit patterns $BP_{t+1}$ to $BP_n$. In other words, the respective level values $LV_1$ to $LV_t$ are assigned to the reference bit positions $RBL_1$ to $RBL_t$, whereas the same level value $LV_{t+1}$ is assigned to the reference bit positions $RBL_{t+1}$ to $RBL_n$.

In the following description, as shown in FIG. 10, the bit pattern $BP_w$ is one of the bit patterns $BP_1$ to $BP_n$. Similarly, the reference bit position $RBL_w$ is one of the reference bit positions $RBL_1$ to $RBL_n$. In other words, w is a natural number in the range from 1 to n. The level value $LV_y$ is one of the level values $LV_1$ to $LV_{t+1}$, and is expressed in z bits; y is a natural number in the range from 1 to (t+1); and z is the number of digits which are required when converting (t+1) into a binary expression. Preferably, the value of z is as small as possible. For example, when t=5, z is most preferably 3.

The level selection section 2322 detects the bit position at which the first instance of "1" appears, the check being begun at the MSB of the current maximum differential data $MDD_v$. In other words, the level selection section 2322 determines one of the reference bit positions $RBL_1$ to $RBL_n$ which corresponds to the current maximum differential data $MDD_v$. Next, the level selection section 2322 selects one of the level values $LV_1$ to $LV_{t+1}$ which is assigned to the currently-determined one of the reference bit positions $RBL_1$ to $RBL_n$, and outputs this level value to both the data reduction section 233 and the packet assembling section 24. Among the level values $LV_1$ to $LV_{t+1}$, the currently-outputted level value is referred to as the "level value $LV_y$", as defined earlier.

Figure 11:
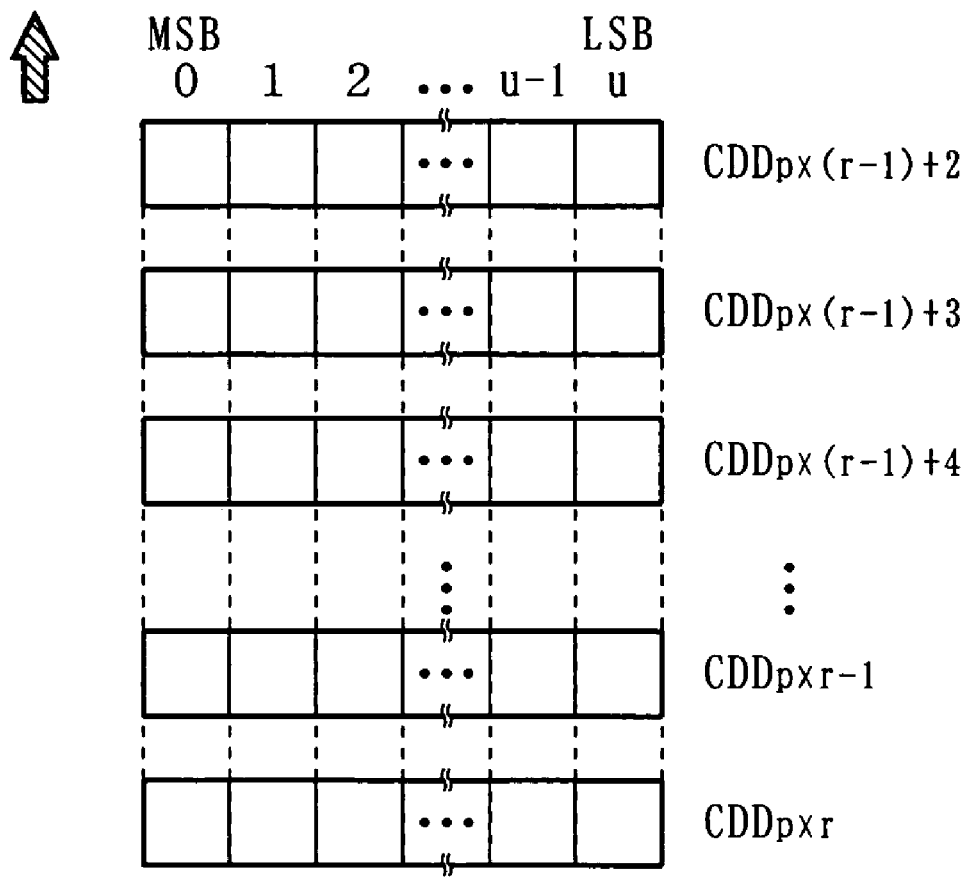
FIG. 11 is a diagram illustrating a format of compressed differential data $CDD_{p\times(r-1)+2}$ to $CDD_{p\times r}$ which are outputted from a data reduction section 233 shown in FIG. 7.

As described above, the data reduction section 233 receives the differential data $DD_{p \times (r-1)+2}$ to $DD_{p \times r}$ from the buffer section 231. The data reduction section 223 also receives the level value $LV_y$ from the level determination section 232. Based on the current level value $LV_y$, the data reduction section 233 deletes t bits from each of the current differential data $DD_{p \times (r-1)+2}$ to $DD_{p \times r}$. As a result, as shown in FIG. 11, the data reduction section 233 generates compressed differential data $CDD_{p \times (r-1)+2}$ to $CDD_{p \times r}$, each of which is composed of u bits.

According to the present embodiment of the invention, as shown in FIG. 12, the bits to be deleted from the current differential data $DD_{p \times (r-1)+2}$ to $DD_{p \times r}$ are predetermined for each of the aforementioned level values $LV_1$ to $LV_{t+1}$. For the sake of illustration, FIG. 12 shows an exemplary case in which n=8, t=5, and u=4. Specifically, regardless of which one of the level values $LV_1$ to $LV_{t+1}$ is currently received, the data reduction section 233 leaves intact (i.e., without deleting) the sign bits $SB_{p \times (r-1)+2}$ to $SB_{p \times r}$ of all differential data $DD_{p \times (r-1)+2}$ to $DD_{p \times r}$. When the level value $LV_1$ is received, the data reduction section 233 leaves intact the aforementioned reference bit position $RBL_1$ and the following (u−2) bits (i.e., the (u−2) bits immediately on the lower side) contained in each of the differential data $DD_{p \times (r-1)+2}$ to $DD_{p \times r}$, while deleting the other t bits. Similarly, when one of the level values $LV_2$ to $LV_t$ is received, the data reduction section 233 leaves intact the aforementioned reference bit positions $RBL_2$ to $RBL_t$ and the following (u−2) bits in each of the differential data $DD_{p \times (r-1)+2}$ to $DD_{p \times r}$. When the level value $LV_{t+1}$ is received, the data reduction section 233 leaves intact the lower (u−1) bits in each of the differential data $DD_{p \times (r-1)+2}$ to $DD_{p \times r}$, while deleting the second to (u−2)$^{th}$ bits as counted from the MSB.

Figure 13:
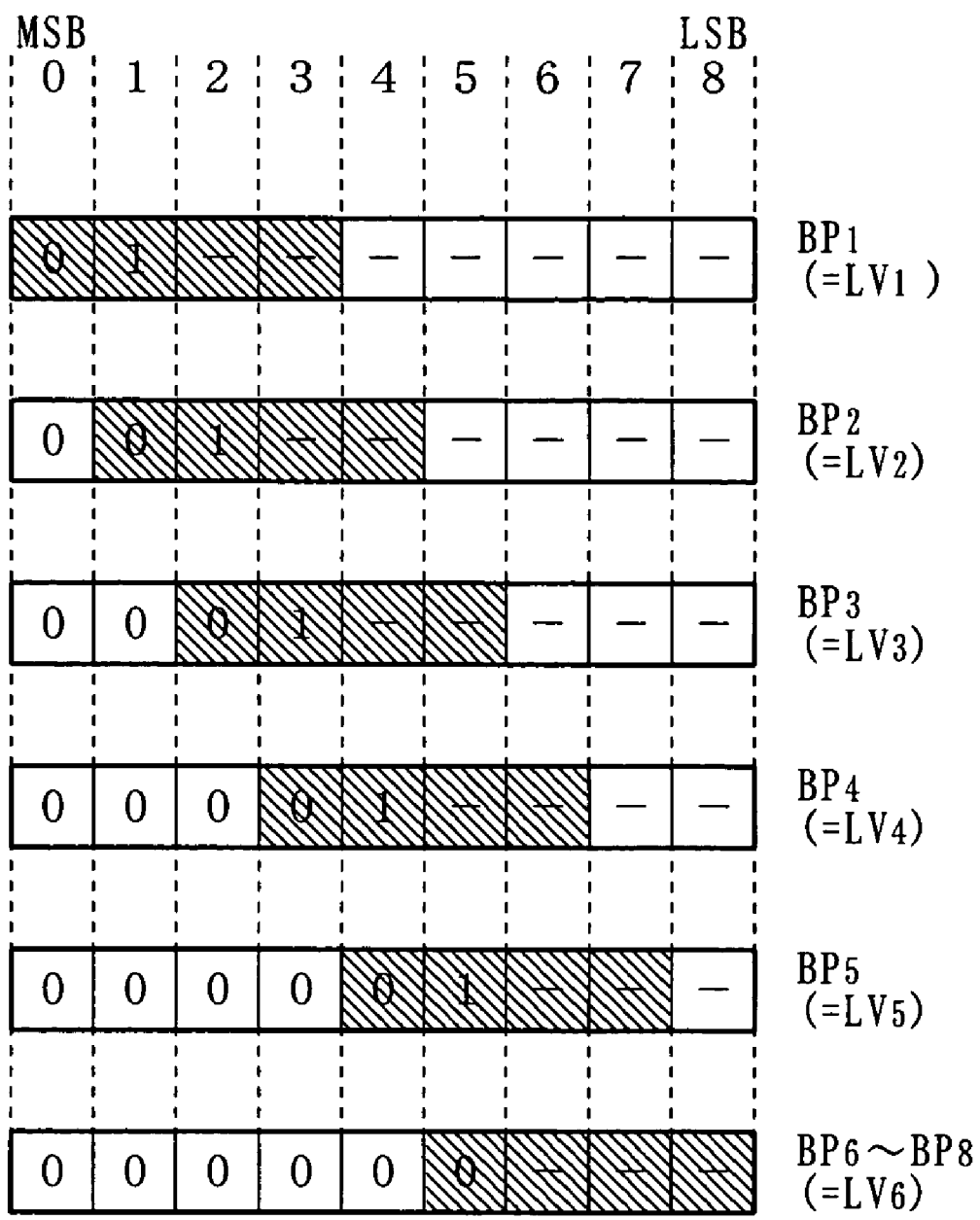
FIG. 13 is a diagram illustrating another exemplary relationship between the level values $LV_1$ to $LV_{t+1}$ shown in FIG. 10 and the bits to be deleted from the differential data $DD_{p\times(r-1)+2}$ to $DD_{p\times r}$.

As mentioned earlier, it is assumed that the sign bits $SB_{p \times (r-1)+2}$ to $SB_{p \times r}$ are "0". Under this assumption, the data reduction section 233 may alternatively operate in the manner shown in FIG. 13, so that when one of the level values $LV_1$ to $LV_t$ is received, the data reduction section 233 simply leaves intact the reference bit positions $RBL_2$ to $RBL_t$ as well as its preceding bit and the following (u−2) bits in each of the differential data $DD_{p \times (r-1)+2}$ to $DD_{p \times r}$. When the level value $LV_{t+1}$ is received, the lower u bits are left intact in each of the differential data $DD_{p \times (r-1)+2}$ to $DD_{p \times r}$. Note that the operation scheme of FIG. 13 is directed to the same exemplary case which FIG. 12 is drawn to, i.e., n=8, t=5, and u=4.

Thus, the data reduction section 233 deletes t bits from each of the currently-received differential data $DD_{p \times (r-1)+2}$ to $DD_{p \times r}$ to generate compressed differential data $CDD_{p \times (r-1)+2}$ to $CDD_{p \times r}$, each of which is composed of u bits. The respective generated compressed differential data $CDD_{p\times(r-1)+2}$ to $CDD_{p\times r}$ are outputted to the packet assembling section 24.

The above description illustrates the case where the sign bits $SB_{p\times(r-1)+2}$ to $SB_{p\times r}$ are "0". On the other hand, in the case where the sign bits $SB_{p\times(r-1)+2}$ to $SB_{p\times r}$ are "1", the level selection section 2322 detects the reference bit position at which the first instance of "0" appears, as counted from the MSB of the currently-received maximum differential data $MDD_y$. Furthermore, the level selection section 2322 selects one of the level values $LV_1$ to $LV_{t+1}$ which is assigned to the currently-determined reference bit position, and outputs this level value to both the data reduction section 233 and the packet assembling section 24.

Figure 14:
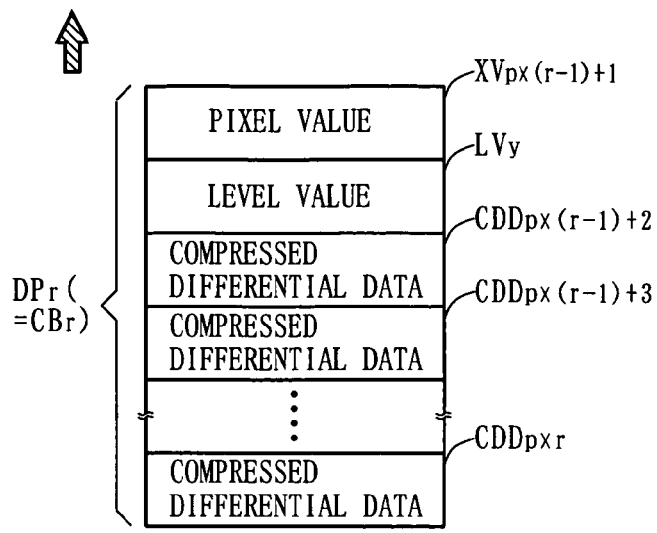
FIG. 14 is a diagram illustrating a format of data packet $DP_r$ which is outputted from a packet assembling section 24 shown in FIG. 5.

As mentioned earlier, the packet assembling section 24 receives the pixel value $XV_{p\times(r-1)+1}$ from the splitter section 21 as well as the level value $LV_y$ from the level determination section 232. The packet assembling section 24 also receives the compressed differential data $CDD_{p\times(r-1)+2}$ to $CDD_{p\times r}$ from the data reduction section 233. Based on these received data, the packet assembling section 24 assembles a data packet $DP_r$ as shown in FIG. 14. As shown in FIG. 14, the assembled data packet $DP_r$ contains the pixel value $XV_{p\times(r-1)+1}$, the level value $LV_y$, and the compressed differential data $CDD_{p\times(r-1)+2}$ to $CDD_{p\times r}$, and has a fixed length of $\{(n+z+u\times(n-1)\}$ bits. The packet assembling section 24 outputs the assembled data packet $DP_r$ to the data sending section 3 as the aforementioned compressed block $CB_r$ (see FIG. 1).

As shown in FIG. 1, the data sending section 3 includes a buffer section 31 and a sending control section 32. The buffer section 31 stores the fixed-length data packet $DP_r$. Since typical conventional image compression schemes such as the MPEG scheme or the DVC scheme perform a variable-length coding, a large-capacity transmission buffer is inevitably required. The use of such a large-capacity transmission buffer for buffering variable-length encoded data may introduce a substantial delay time in the conventional image compression schemes. In contrast, according to the present embodiment of the invention, the buffer section 31 only needs to store the fixed-length data packet $DP_r$, so that the delay time associated with the buffering which takes place in the buffer section 31 is minimized, and the delay time becomes substantially constant for every data packet $DP_r$. Thus, the use of fixed-length data packet $DP_r$ also serves to reduce the delay time relative to that which is associated with the conventional image compression schemes.

After the data packet $DP_r$ is stored in the buffer section 31, the sending control section 32 receives the data packet $DP_r$ from the buffer section 31 and sends it onto the transmission path N. The data packet $DP_r$, as an example of compressed data $CD_r$, is transmitted through the transmission path N and then received by the receiver Rx, as shown in FIG. 1.

Figure 15:
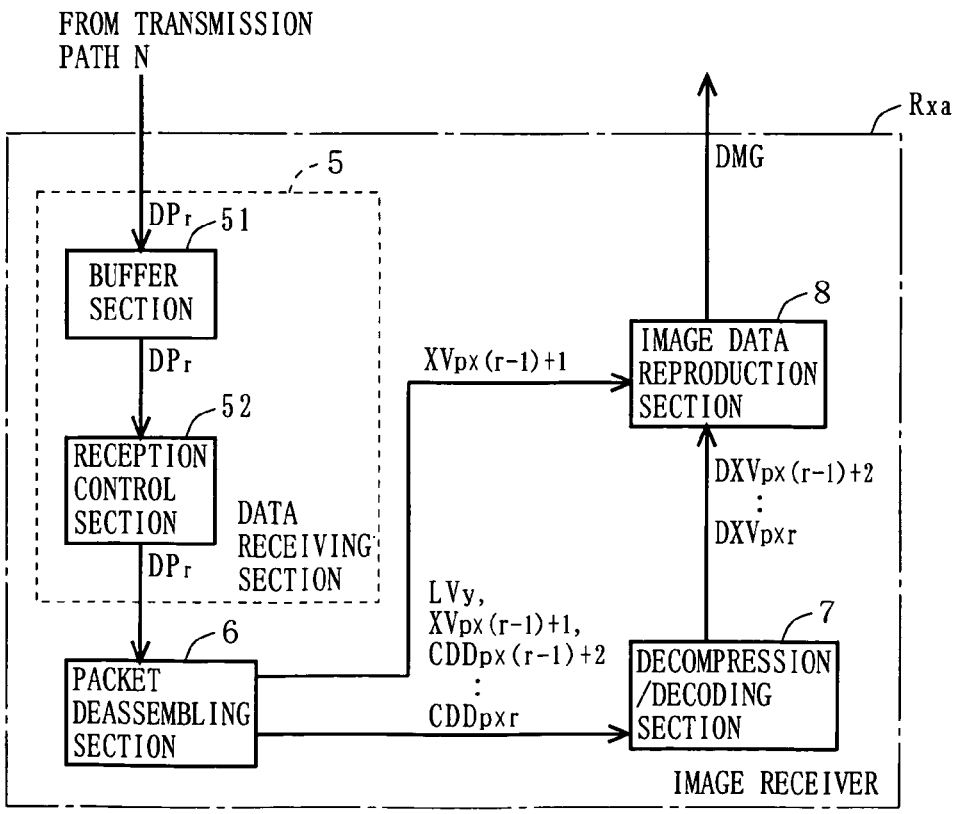
FIG. 15 is a block diagram illustrating a first implementation (a "receiver Rxa") of a receiver Rx shown in FIG. 1.
Figure 16:
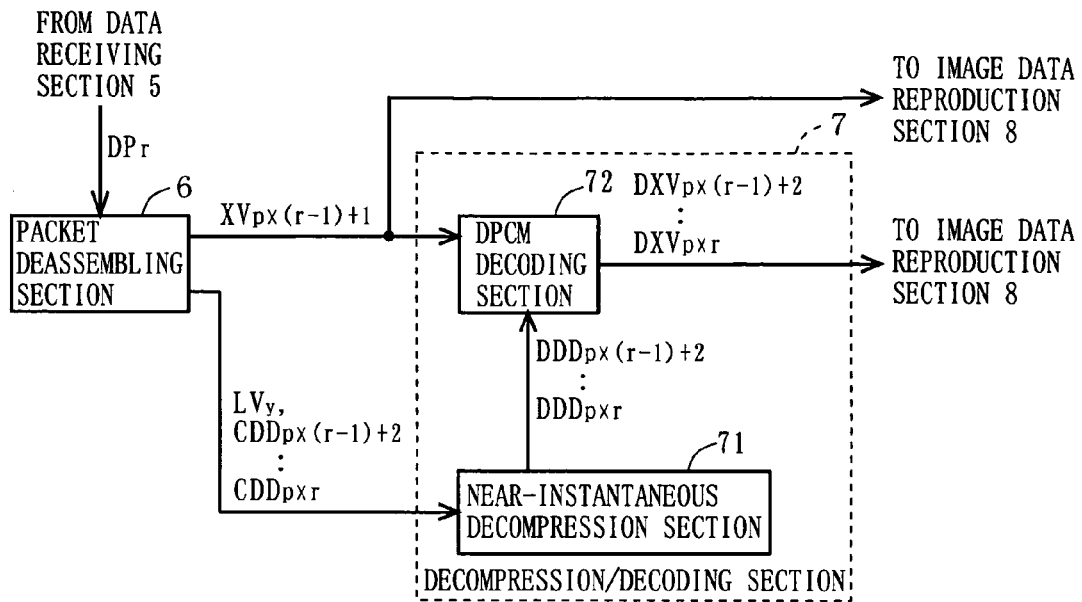
FIG. 16 is a block diagram illustrating the detailed structure of a decompression/decoding section 7 shown in FIG. 15.
Figure 17:
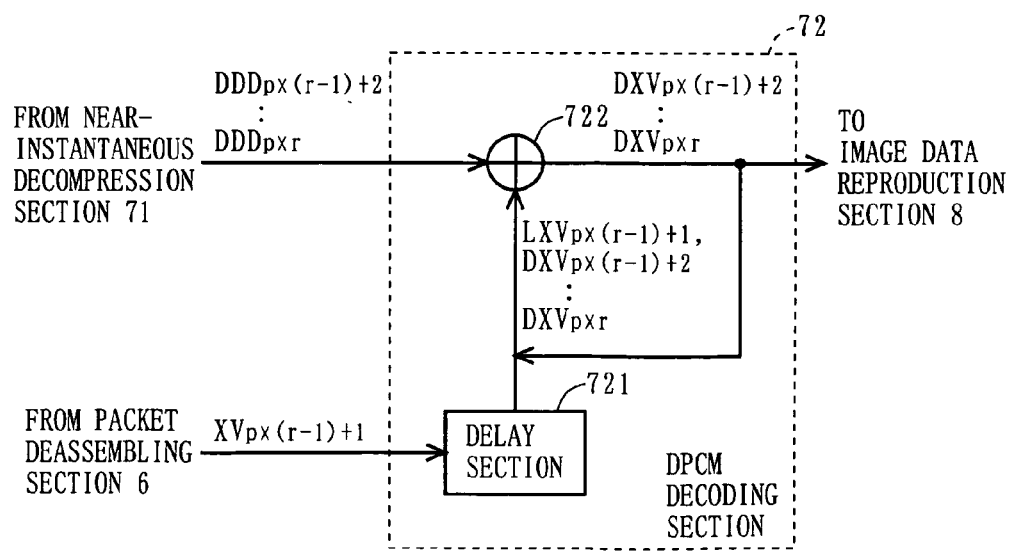
FIG. 17 is a block diagram illustrating the detailed structure of a DPCM decoding section 72 shown in FIG. 15.

The receiver Rx subjects the received data packet $DP_r$ to predetermined processing. Hereinafter, with reference to FIG. 15 to FIG. 17, a first implementation of the receiver Rx shown in FIG. 1 will be described. In the following description, the first implementation of the receiver Rx will be referred to as a "receiver Rxa". As shown in FIG. 15, in order to realize reproduction processing for the image data TD, the receiver Rxa includes a data receiving section 5, a packet deassembling (disassembling) section 6, a decompression/decoding section 7, and an image data reproduction section 8. The data receiving section 5 includes a buffer section 51 and a reception control section 52. As shown in FIG. 16, the decompression/decoding section 7 includes a near-instantaneous decompression section 71 and a DPCM decoding section 72. As shown in FIG. 17, the DPCM decoding section 72 includes a delay section 721 and an adder section 722.

Next, the reproduction processing for the image data TD which is performed by the receiver Rxa will be described in detail. The data packets $DP_r$ from the transmission path N are sequentially received by the receiving section 5. In the receiving section 5, the buffer section 51 stores the data packet $DP_r$. The buffer section 51, which is only required to store the fixed-length data packets $DP_r$, as is the case with the buffer section 31, contributes to the minimization of the delay time. After the buffering, the reception control section 52 receives the data packet $DP_r$ from the buffer section 51, and outputs the data packet $DP_r$ to the packet deassembling section 6.

As described above, the data packet $DP_r$ contains the pixel value $XV_{p\times(r-1)+1}$, the level value $LV_y$, and the compressed differential data $CDD_{p\times(r-1)+2}$ to $CDD_{p\times r}$ (see FIG. 14). For every received data packet $DP_r$, the packet deassembling section 6 performs a deassembling process, and, as shown in FIG. 15, outputs the pixel value $XV_{p\times(r-1)+1}$ which is located at the beginning of the received data packet $DP_r$ to the image data reproduction section 8, and outputs the pixel value $XV_{p\times(r-1)+1}$, the level value $LV_y$, and the compressed differential data $CDD_{p\times(r-1)+2}$ to $CDD_{p\times r}$ to the decompression/decoding section 7. To describe the outputting to the decompression/decoding section 7 more specifically, as shown in FIG. 16, the packet deassembling section 6 sequentially outputs the level value $LV_y$ and the compressed differential data $CDD_{p\times(r-1)+2}$ to $CDD_{p\times r}$ to the near-instantaneous decompression section 71. Furthermore, as shown in FIG. 17, the packet deassembling section 6 outputs the pixel value $XV_{p\times(r-1)+1}$ to the delay section 721.

As described earlier, the decompression/decoding section 7 receives the pixel value $XV_{p\times(r-1)+1}$, the level value $LV_y$, and the compressed differential data $CDD_{p\times(r-1)+2}$ to $CDD_{p\times r}$, as shown in FIG. 15. The decompression/decoding section 7 employs the received pixel value $XV_{p\times(r-1)+1}$ and the level value $LV_y$ to perform a decompression/decoding process for the compressed differential data $CDD_{p\times(r-1)+2}$ to $CDD_{p\times r}$, thereby generating decoded pixel values $DXV_{p\times(r-1)+2}$ to $DXV_{p\times r}$ which can be regarded as substantially the same as the aforementioned pixel values $XV_{p\times(r-1)+2}$ to $XV_{p\times r}$.

More specifically, the near-instantaneous decompression section 71 in the decompression/decoding section 7 receives the level value $LV_y$ and the compressed differential data $CDD_{p\times(r-1)+2}$ to $CDD_{p\times r}$. The near-instantaneous decompression section 71 performs a near-instantaneous decompression to decompress the compressed differential data $CDD_{p\times(r-1)+2}$ to $CDD_{p\times r}$ based on the received level value $LV_y$. Thus, the near-instantaneous decompression section 71 generates decompressed differential data $DDD_{p\times(r-1)+2}$ to $DDD_{p\times r}$, which are sequentially outputted to the adder section 722.

To describe the above process more specifically, the near-instantaneous decompression section 71 recognizes the reference bit position $RBL_w$ in the received level value $LV_y$. Specifically, as can be seen from FIG. 10, one of the reference bit position $RBL_1$ to the reference bit position $RBL_t$ will be recognized in the case where y is in the range from 1 to t. In the case where y=t+1, the near-instantaneous decompression section 71 will recognize one of the reference bit positions $RBL_{t+1}$ to $RBL_n$.

Once the reference bit position $RBL_w$ is determined, the near-instantaneous decompression section 71 knows the bit positions which were deleted from the differential data $DD_{p\times(r-1)+2}$ to $DD_{p\times r}$ in the transmitter Tx. More specifically, as can be seen from FIG. 12 or FIG. 13, when the level value $LV_1$ is received, the near-instantaneous decompression section 71 recognizes that t bits have been deleted from the differential data $DD_{p\times(r-1)+2}$ to $DD_{p\times r}$ while leaving intact the MSB (i.e., sign bits $SB_{p\times(r-1)+2}$ to $SB_{p\times r}$), the reference bit position $RBL_1$, and the following (u−2) bits. Similarly, when the level values $LV_2$ to $LV_t$ are received, the near-instantaneous decompression section 71 recognizes that t bits have been deleted from the differential data $DD_{p\times(r-1)+2}$ to $DD_{p\times r}$ while leaving intact the respective MSBs, the aforementioned respective reference bit positions $RBL_2$ to $RBL_t$, and the following (u−2) bits. When the level value $LV_{t+1}$ is received, the near-instantaneous decompression section 71 recognizes that the second to (u−2)$^{th}$ bits as counted from the MSB have been deleted from each of the differential data $DD_{p\times(r-1)+2}$ to $DD_{p\times r}$.

Having thus determined the deleted bit positions, the near-instantaneous decompression section 71 adds a bit(s) of predetermined values to each of the compressed differential data $CDD_{p\times(r-1)+2}$ to $CDD_{p\times r}$, thereby generating the decompressed differential data $DDD_{p\times(r-1)+2}$ to $DDD_{p\times r}$, which can be regarded as substantially the same as the aforementioned differential data $DD_{p\times(r-1)+2}$ to $DD_{p\times r}$.

Figure 18A:
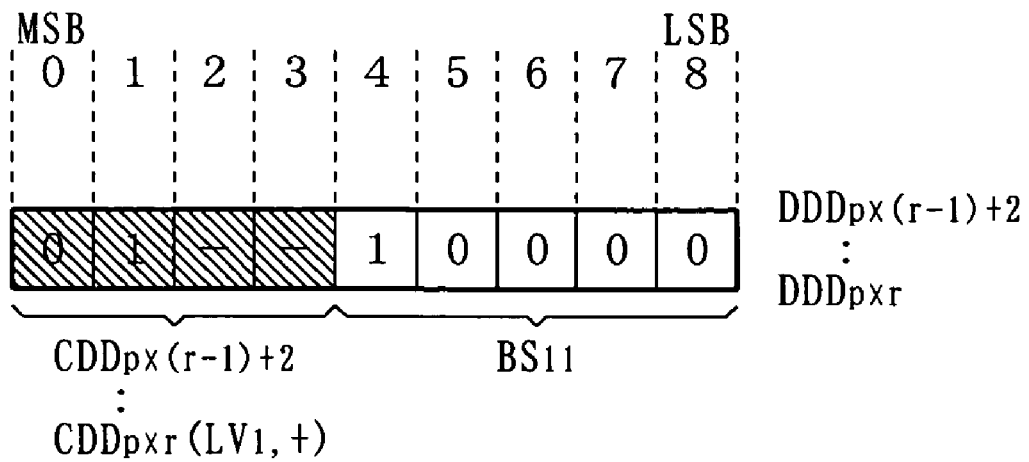
FIGS. 18A and 18B are diagrams illustrating the processing to be performed by a near-instantaneous decompression section 71 shown in FIG. 16 responsive to the level value $LV_1$.
Figure 18B:
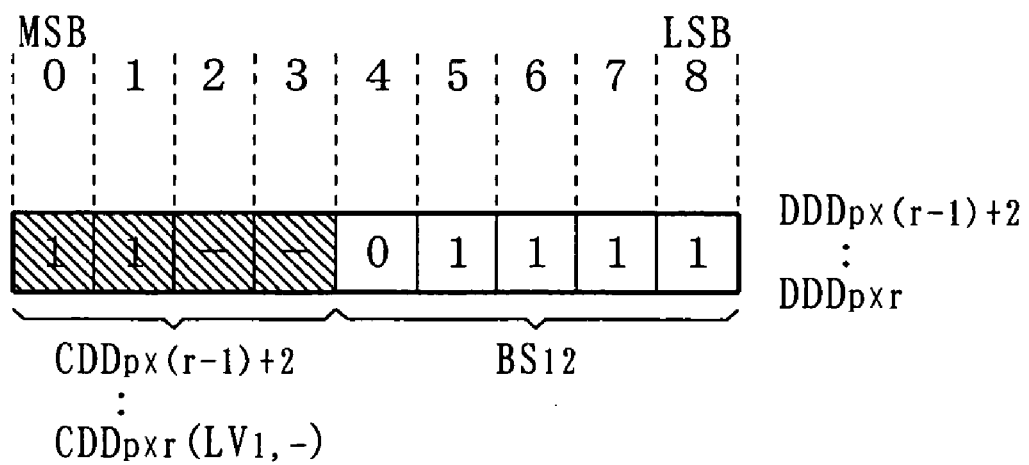

More specifically, when receiving the level value $LV_1$, as shown in FIGS. 18A and 18B, the near-instantaneous decompression section 71 adds a bit sequence $BS_{11}$ or bit sequence $BS_{12}$ immediately after each of the compressed differential data $CDD_{p\times(r-1)+2}$ to $CDD_{p\times r}$. The bit sequences $BS_{11}$ and $BS_{12}$ each have a predetermined bit pattern composed of t bits. Note that the bit sequences $BS_{11}$ and $BS_{12}$ shown in FIGS. 18A and 18B are directed to the same exemplary case which FIG. 12 is drawn to, i.e., n=8, t=5, and u=4. As shown in FIG. 18A, the bit sequence $BS_{11}$, whose first bit is "1" and other (t−1) bits are "0", is added to those compressed differential data $CDD_{p\times(r-1)+2}$ to $CDD_{p\times r}$ which have positive values. On the other hand, the bit sequence $BS_{12}$, which has a reversed bit pattern (i.e., the first bit of the bit sequence $BS_{12}$ is "0" and the other (t−1) bits are "1") relative to the bit sequence $BS_{11}$, is added to those compressed differential data $CDD_{p\times(r-1)+2}$ to $CDD_{p\times r}$ which have negative values. Thus, the decompressed differential data $DDD_{p\times(r-1)+2}$ to $DDD_{p\times r}$ are generated. The bit patterns of the bit sequences $BS_{11}$ and $BS_{12}$ are prescribed as above in order to ensure that the differences between the values of the decompressed differential data $DDD_{p\times(r-1)+2}$ and the values of their corresponding original differential data $DD_{p\times(r-1)+2}$ are small.

Figure 19A:
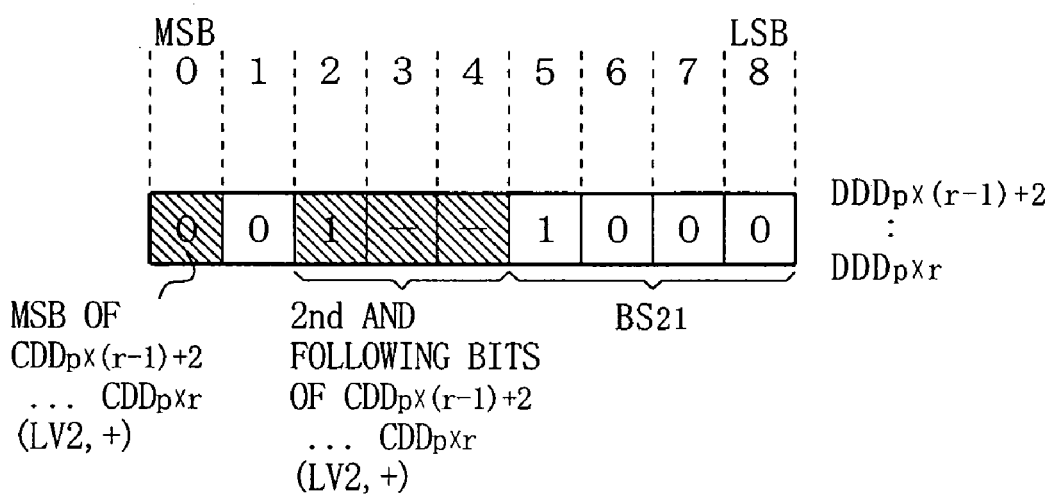
FIGS. 19A and 19B are diagrams illustrating the processing to be performed by the near-instantaneous decompression section 71 shown in FIG. 16 responsive to the level value $LV_2$.
Figure 19B:
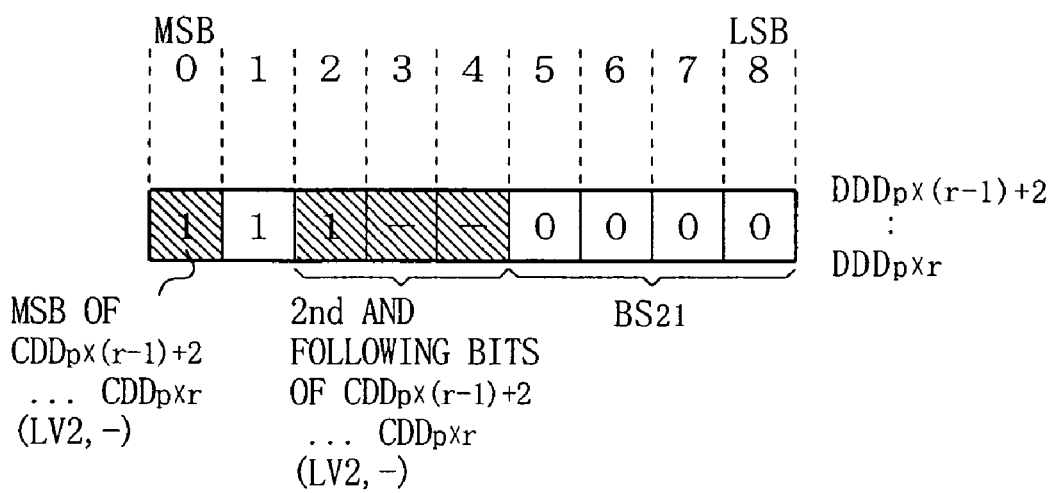

When receiving the level value $LV_2$, as shown in FIG. 19A, the near-instantaneous decompression section 71 places the MSBs of the respective compressed differential data $CDD_{p\times(r-1)+2}$ to $CDD_{p\times r}$ at the first bit, while placing the other (u−1) bits at the third bit (i.e., the reference bit position $RBL_2$) through the (u+1)$^{th}$ bit. Furthermore, for those compressed differential data $CDD_{p\times(r-1)+2}$ to $CDD_{p\times r}$ which have positive values, the near-instantaneous decompression section 71 adds "0" at the second bit, while adding a bit sequence $BS_{21}$ composed of (t−1) bits at the (u+2)$^{th}$ through n$^{th}$ bits. Note that the bit sequence $BS_{21}$ is a sequence in which the only instance of "1" is at the first bit, as in the bit sequence $BS_{11}$. On the other hand, for those compressed differential data $CDD_{p\times(r-1)+2}$ to $CDD_{p\times r}$ which have negative values, as shown in FIG. 19B, the near-instantaneous decompression section 71 adds "1" at the second bit, while adding a bit sequence $BS_{22}$ composed of (t−1) bits at the (u+2)$^{th}$ through n$^{th}$ bits. Note that the bit sequence $BS_{22}$ is a sequence in which the only instance of "0" is at the first bit.

Thereafter, when the level values $LV_3$ to $LV_t$ are received, similarly to when the level value $LV_2$ is received, the near-instantaneous decompression section 71 places the MSBs of the respective compressed differential data $CDD_{p\times(r-1)+2}$, $CDD_{p\times(r-1)+3}$, ... $CDD_{p\times r}$ at the first bit, while placing the other (u−1) bits at the reference bit positions $RBL_3$, $RBL_4$, ... $RBL_t$ through the (u+1)$^{th}$ bit. Furthermore, for those compressed differential data $CDD_{p\times(r-1)+2}$, $CDD_{p\times(r-1)+3}$, ... $CDD_{p\times r}$ which have positive values, the near-instantaneous decompression section 71 sets "0" at the second bit through the bit immediately before the reference bit positions $RBL_3$, $RBL_4$, ... $RBL_t$, "1" at the (u+2)$^{th}$ bit, and "0" at the (u+3)$^{th}$ through n$^{th}$ bits. For those compressed differential data $CDD_{p\times(r-1)+2}$, $CDD_{p\times(r-1)+3}$, ... $CDD_{p\times r}$ which have negative values, bits which are reverses of those set for the compressed differential data having positive values are set. As shown in FIG. 16, the decompressed differential data $DDD_{p\times(r-1)+2}$ to $DDD_{p\times r}$ which have been thus generated are outputted to the adder section 722 in the DPCM decoding section 72.

As shown in FIG. 16, the DPCM decoding section 72 receives the pixel value $XV_{p\times(r-1)+1}$ from the packet deassembling section 6 and the decompressed differential data $DDD_{p\times(r-1)+2}$ to $DDD_{p\times r}$ from the near-instantaneous decompression section 71. The DPCM decoding section 72 performs an inverse process of the process which is performed by the DPCM encoding section 22 so as to generate the decoded pixel values $DXV_{p\times(r-1)+2}$ to $DXV_{p\times r}$ from the received pixel value $XV_{p\times(r-1)+1}$ and the decompressed differential data $DDD_{p\times(r-1)+2}$ to $DDD_{p\times r}$, and sequentially outputs the decoded pixel values to the image data reproduction section 8.

More specifically, the delay section 721 in the DPCM decoding section 72 receives the pixel value $XV_{p\times(r-1)+1}$ from the packet deassembling section 6. The delay section 721 applies a delay amount $DL_2$ to the received pixel value $XV_{p\times(r-1)+1}$, and outputs the resultant pixel value to the adder section 722 as a delayed pixel value $LXV_{p\times(r-1)+1}$. Herein, the delay amount $DL_2$ is typically an amount of time corresponding to predetermined clocks. More specifically, the delay amount $DL_2$ is prescribed to a value which ensures that the decompressed differential data $DDD_{p\times(r-1)+2}$ from the near-instantaneous decompression section 71 and the delayed pixel value $LXV_{p\times(r-1)+1}$ are received by the adder section 722 in the DPCM decoding section 72 substantially simultaneously.

The adder section 722 also sequentially receives sets of decompressed differential data $DDD_{p\times(r-1)+2}$ to $DDD_{p\times r}$. The adder section 722 adds the decompressed differential data $DDD_{p\times(r-1)+2}$ (which is received before any other decompressed differential data) and the concurrently-received delayed pixel value $LXV_{p\times(r-1)+1}$ to generate a decoded pixel value $DXV_{p\times(r-1)+2}$. The decoded pixel value $DXV_{p\times(r-1)+2}$ which has been thus generated is outputted to the image data reproduction section 8 as mentioned above, and is also fed back to the adder section 722. Next, the adder section 722 adds the decompressed differential data $DDD_{p\times(r-1)+3}$ from the near-instantaneous decompression section 71 and the concurrently-received decoded pixel value $DXV_{p\times(r-1)+2}$ to generate a decoded pixel value $DXV_{p\times(r-1)+3}$. The decoded pixel value $DXV_{p\times(r-1)+3}$ which has been thus generated is outputted to the image data reproduction section 8, and also fed back to the adder section 722. Thereafter, in a repetition of similar processing, the adder section 722 adds the decompressed differential data $DDD_{p\times(r-1)+4}$, $DDD_{p\times(r-1)+5}$, ... $DDD_{p\times r-1}$ from the near-instantaneous decompression section 71 and the previously-generated decoded pixel values $DXV_{p\times(r-1)+3}$, $DXV_{p\times(r-1)+4}$, ... $DXV_{p\times r-2}$ to generate decoded pixel values $DXV_{p\times(r-1)+4}$, $DXV_{p\times(r-1)+5}$, ... $DXV_{p\times r-1}$, respectively, which are outputted to the image data reproduction section 8 and itself. Furthermore, the adder section 722 adds the decompressed differential data $DDD_{p\times r}$ from the near-instantaneous decompression section 71 and the previously-generated decoded pixel value $DXV_{p\times r-1}$ to generate a decoded pixel value $DXV_{p\times r}$, which is outputted only to the image data reproduction section 8. Thus, the DPCM decoding section 72 generates the decoded pixel values $DXV_{p\times(r-1)+2}$ to $DXV_{p\times r}$, and outputs these decoded pixel values to the image data reproduction section 8.

Figure 20:
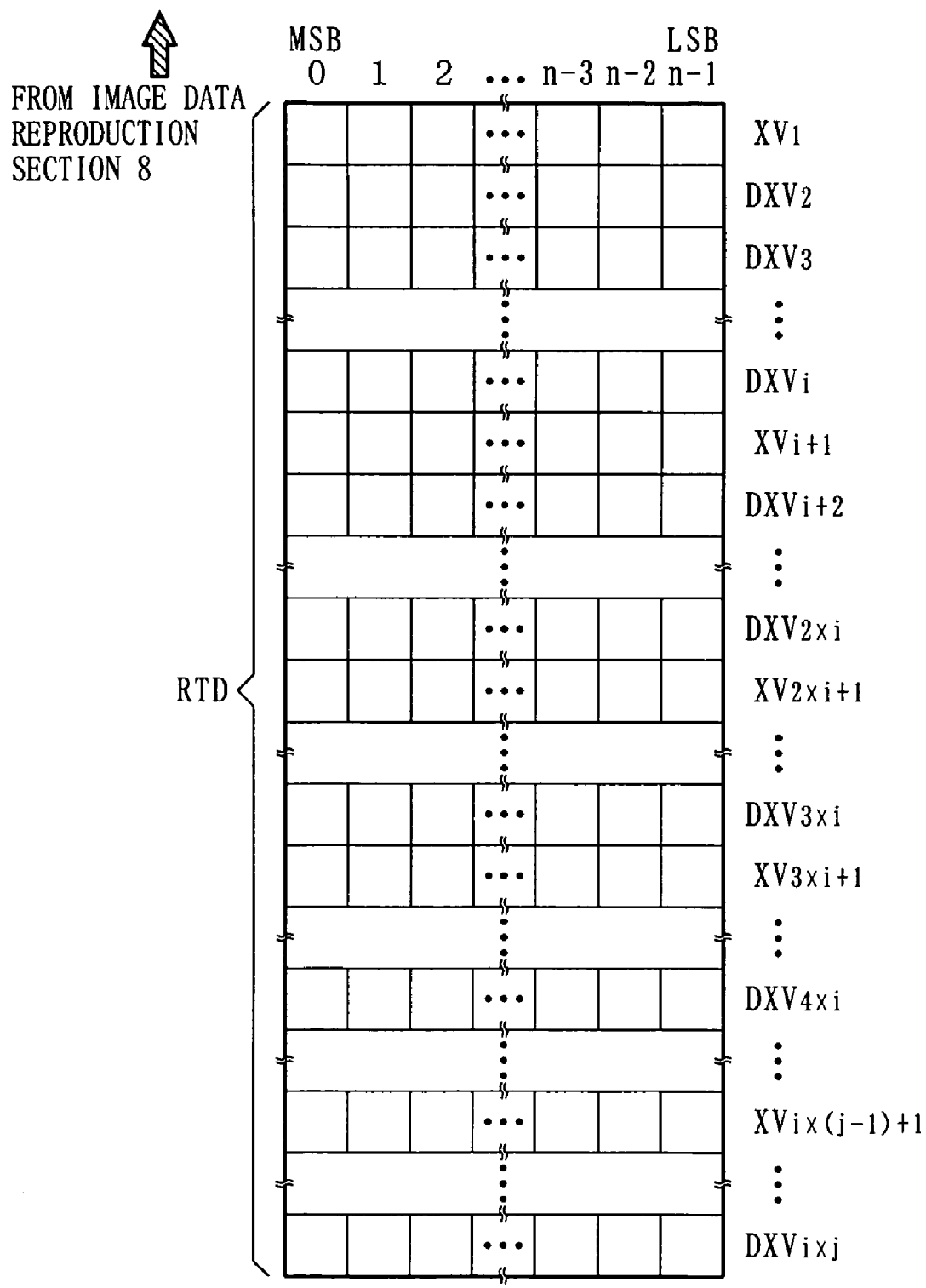
FIG. 20 is a diagram illustrating a format of reproduced image data RTD to be reproduced by an image data reproduction section 8 shown in FIG. 15.

As a result of the above-described processing, the image data reproduction section 8 sequentially receives q sets of decoded pixel values $DXV_{p\times(r-1)+2}$ to $DXV_{p\times r}$. Furthermore, prior to the arrival of each set of decoded pixel values $DXV_{p\times(r-1)+2}$ to $DXV_{p\times r}$, the pixel value $XV_{p\times(r-1)+1}$ is received from the packet deassembling section 6. In summary, the image data reproduction section 8 first receives the pixel value $XV_1$ and the decoded pixel values $DXV_2$ to $DXV_p$. The pixel value $XV_1$ and the decoded pixel values $DXV_2$ to $DXV_p$ which are thus generated are substantially identical to the pixel value $XV_1$ and the pixel values $XV_2$ to $XV_p$ in the first line (along the width direction HD) of the image MG (see FIG. 2A or 2B). Subsequently, as the image data reproduction section 8 receives the $q^{th}$ set of decoded pixel values, all of the pixel value $XV_{p\times(r-1)+1}$ and the decoded pixel values $DXV_{p\times(r-1)+2}$ to $DXV_{p\times r}$ which are necessary for the reproduction of the image MG are on hand. Thus, as shown in FIG. 20, the image data reproduction section 8 generates reproduced image data RTD, which represents an image which hardly presents any difference to the human eye from the image MD represented by the image data TD shown in FIG. 3, by arranging the pixel value $XV_{p\times(r-1)+1}$ and the decoded pixel values $DXV_{p\times(r-1)+2}$ to $DXV_{p\times r}$ in the order in which they are received.

As described above, according to the present embodiment of the invention, encoding and compression are performed for a fixed-length data block $DB_r$, which is composed of p pixel values $XV_{p\times(r-1)+1}$ to $XV_{p\times r}$ arranged in line along the width direction HD. In other words, unlike in the conventional image compression schemes (MPEG or DVC) where image correlation on a macro block-by-macro block basis is utilized, the correlation between pixels arranged in line along the width direction HD is utilized to compress an image MG. As a result, the delay time which is incurred before the reproduced image data RTD is generated by the receiver Rx can be reduced.

Figure 21:
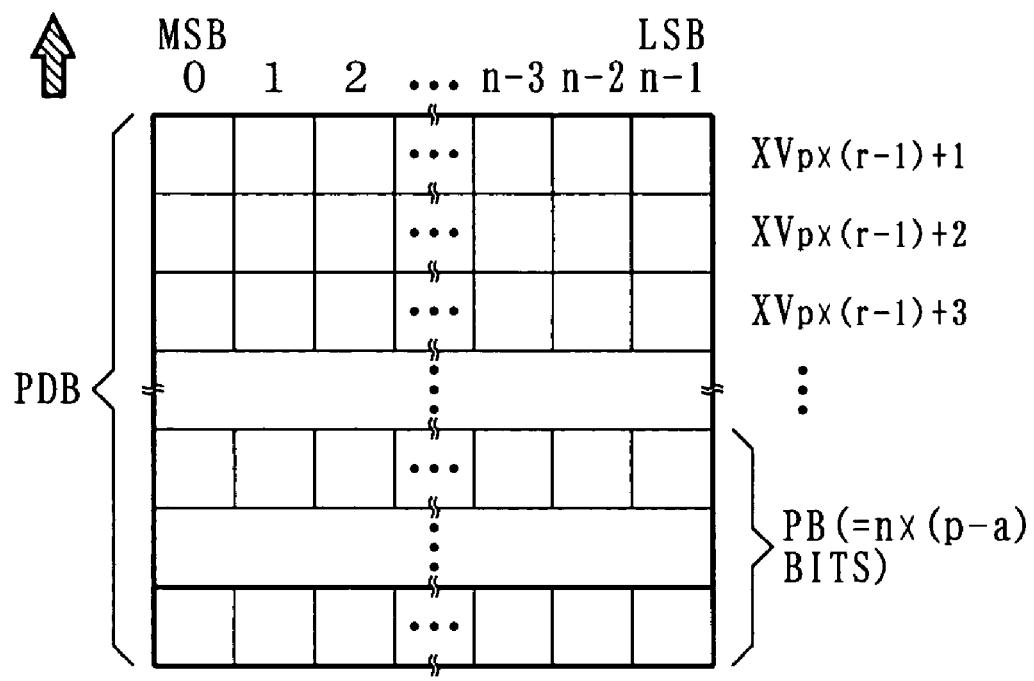
FIG. 21 is a diagram illustrating the generation of padded data block PDB performed by the blocking section 1.

In the above embodiment of the invention, the blocking section 1 is illustrated as generating data blocks $DB_r$ each composed of p received pixel values $XV_1$ to $XV_{i\times j}$, where p is a divisor of i. However, i does not need to be an exact integer multiple of p, but any number a of pixel values XV may be left as a remainder. In such cases, as shown in FIG. 21, the blocking section 1 adds a padding bit sequence PBS composed of $n\times(p-a)$ bits after the a pixel values XV to generate padded data blocks PDB having the same size as that of the respective data blocks $DB_r$. Also in the case where $i\times j$ is not an exact integer multiple of p, it is preferable to generate similar padded data blocks PDB.

Based on the above consideration, the data compression section 2 can subject the padded data blocks to the same processing as that for the data blocks to generate compressed blocks. Furthermore, since the blocking section 1 only needs to add a padding bit sequence PBS for the pixel values XV arranged in line along the width direction HD, and there is no need to add any bit sequence along the longitudinal direction VD, the total number of extra bits to be added to the compressed data $CD_r$ is much smaller than that required for a typical conventional image compression scheme such as the MPEG scheme.

Figure 22:
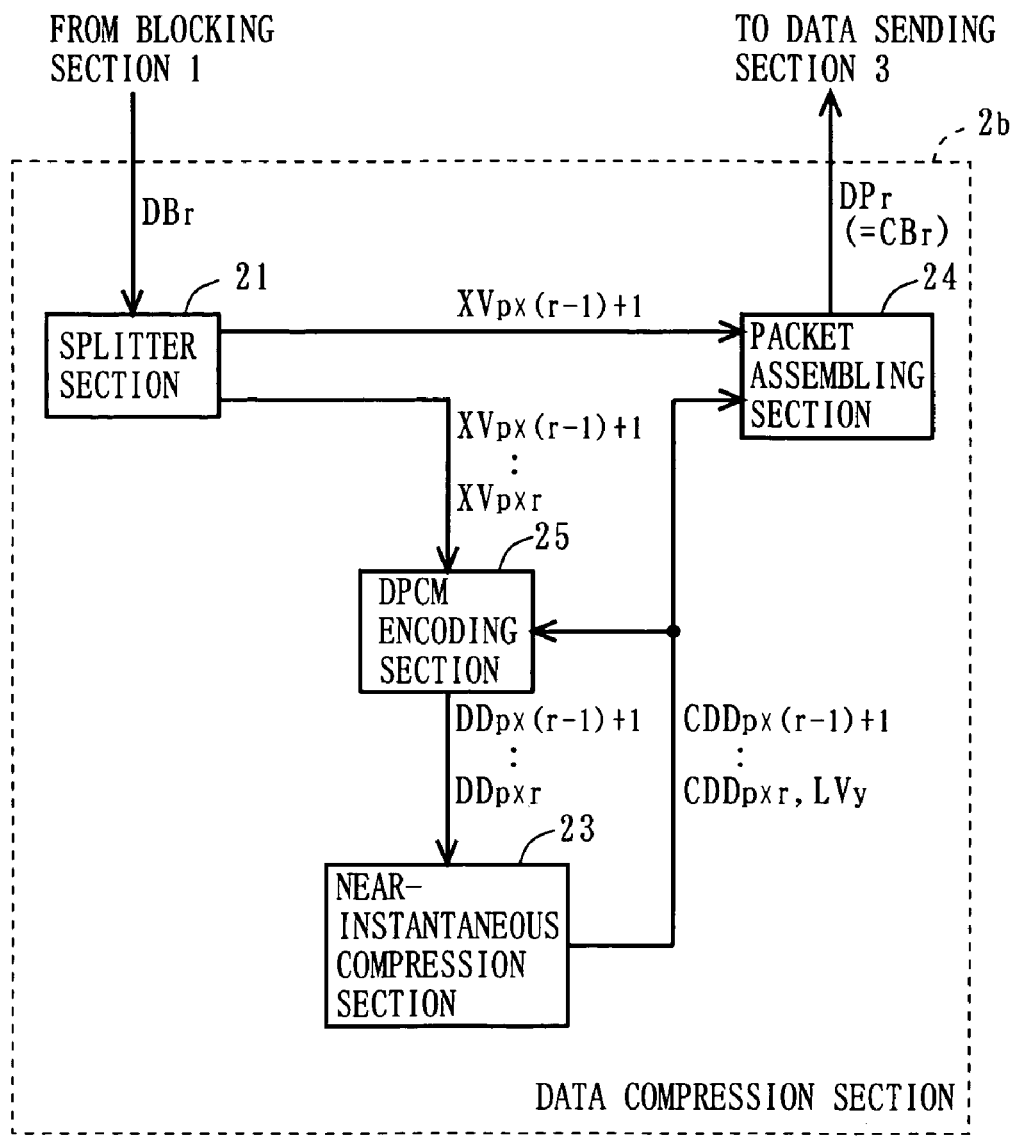
FIG. 22 is a block diagram illustrating a variant (a "data compression section 2b") of the data compression section 2a shown in FIG. 5.

Next, a variant of the above-described data compression section 2a will be described with reference to FIGS. 22 and 23. In the following description, the variant of the data compression section 2a will be referred to as a "data compression section 2b". As shown in FIG. 22, the data compression section 2b differs from the data compression section 2a in that a DPCM encoding section 25 is employed instead of the DPCM encoding section 22. This difference is underlined by the fact that the DPCM encoding section 25 receives compressed differential data $CDD_{p\times(r-1)+1}$ to $CDD_{p\times r}$ and a level value $LV_y$ from a near-instantaneous compression section 23. Since the data compression section 2b is otherwise identical to the data compression section 2a, any component elements in the data compression section 2b which find their counterparts in the data compression section 2a are denoted by the same reference numerals as those employed in connection with the data compression section 2a, and the descriptions thereof are omitted.

Figure 23:
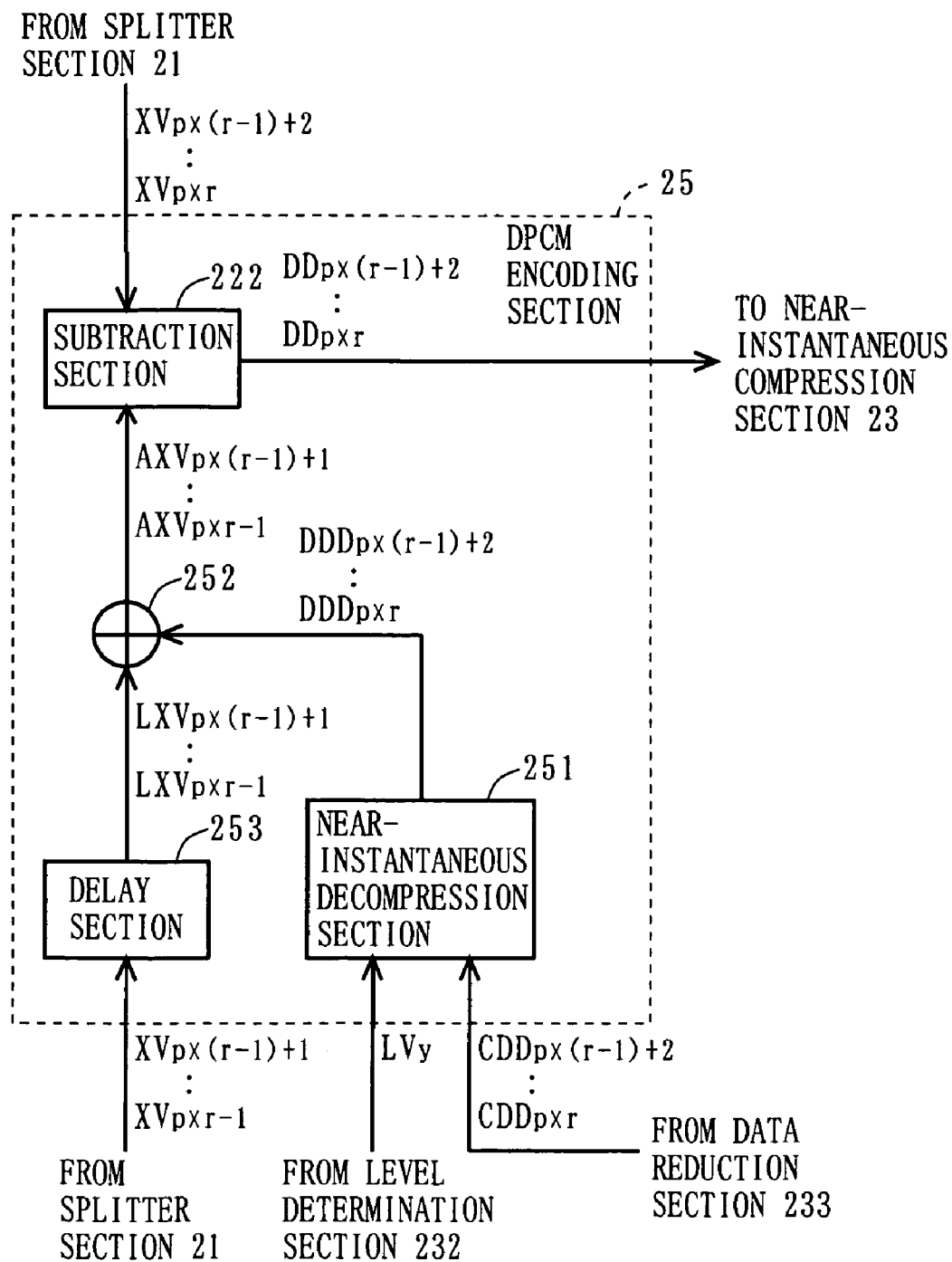
FIG. 23 is a block diagram illustrating the detailed structure of a DPCM encoding section 25 shown in FIG. 22.

As shown in FIG. 23, the DPCM encoding section 25 differs from the DPCM encoding section 22 in that the DPCM encoding section 25 additionally includes the near-instantaneous decompression section 251 and the adder section 252, and that the delay section 252 is employed instead of the delay section 221. Since the DPCM encoding section 25 is otherwise identical to the DPCM encoding section 22, any component elements in the DPCM encoding section 25 which find their counterparts in the DPCM encoding section 22 are denoted by the same reference numerals as those employed in connection with the DPCM encoding section 22, and the descriptions thereof are omitted.

In the DPCM encoding section 25, the near-instantaneous decompression section 251 receives the level value $LV_y$ from the level determination section 232 and the compressed differential data $CDD_{p\times(r-1)+2}$ to $CDD_{p\times r}$ from the data reduction section 233. By performing a near-instantaneous decompression similar to that performed by the near-instantaneous decompression section 71 shown in FIG. 16, the near-instantaneous decompression section 251 generates decompressed differential data $DDD_{p\times(r-1)+2}$ to $DDD_{p\times r}$ from the received compressed differential data $CDD_{p\times(r-1)+2}$ to $CDD_{p\times r}$ in accordance with the level value $LV_y$, and outputs the decompressed differential data $DDD_{p\times(r-1)+2}$ to $DDD_{p\times r}$ to the adder section 252.

The delay section 253 sequentially receives the pixel values $XV_{p\times(r-1)+1}$ to $XV_{p\times r-1}$, as does the aforementioned delay section 221. The delay section 253 applies a delay amount $DL_3$ to each of the received pixel values $XV_{p\times(r-1)+1}$ to $XV_{p\times r-1}$ to generate delayed pixel values $LXV_{p\times(r-1)+1}$ to $LXV_{p\times r-1}$, which are outputted to the adder section 252. The delay amount $DL_3$ is prescribed to a value which ensures that the delayed pixel value $LXV_{p\times(r-1)\times 2}$ from the delay section 253 and the decompressed differential data $DDD_{p\times(r-1)+2}$ from the near-instantaneous decompression section 251 are received by the adder section 252 substantially simultaneously. Generally speaking, the delay amount $DL_3$ is prescribed to a value which ensures that the delayed pixel values $LXV_{p\times(r-1)+2}$, $LXV_{p\times(r-1)+3}$, ... $LXV_{p\times r-1}$ and the compressed differential data $CDD_{p\times(r-1)+2}$, $CDD_{p\times(r-1)+3}$, ... $CDD_{p\times r-1}$ (which are generated on the basis of the same pixel values $XV_{p\times(r-1)+2}$, $XV_{p\times(r-1)+3}$, ... $XV_{p\times r-1}$, respectively) are received by the adder section 252 substantially simultaneously.

The adder section 252 adds the delayed pixel values $LXV_{p\times(r-1)+2}$, $LXV_{p\times(r-1)+3}$, ... $LXV_{p\times r-1}$ and the concurrently-received compressed differential data $CDD_{p\times(r-1)+2}$, $CDD_{p\times(r-1)+3}$, ... $CDD_{p\times r-1}$ to generate added pixel values $AXV_{p\times(r-1)+2}$, $AXV_{p\times(r-1)+3}$, ... $AXV_{p\times r-1}$, which is outputted to the subtraction section 222. Note that, when the delayed pixel value $LXV_{p\times(r-1)+1}$ from the delay section 253 is received by the adder section 252, the adder section 252 is receiving no input from the near-instantaneous decompression section 251, so that the adder section 252 passes the received delayed pixel value $LXV_{p\times(r-1)+1}$ through to the subtraction section 222 as the added pixel value $AXV_{p\times(r-1)+1}$.

As described earlier, the subtraction section 222 receives the pixel values $XV_{p\times(r-1)+2}$ to $XV_{p\times r}$ from the splitter section 21, and the added pixel values $AXV_{p\times(r-1)+1}$ to $AXV_{p\times r-1}$ from the adder section 252. First, the subtraction section 222 subtracts the added pixel value $AXV_{p\times(r-1)+1}$ from the currently-received pixel value $XV_{p\times(r-1)+2}$, and generates a differential data $DD_{p\times(r-1)+2}$ representing a difference value therebetween, such that the generated differential data $DD_{p\times(r-1)+2}$ is in the same format as that shown in FIG. 8. Furthermore, the subtraction section 222 subtracts the added pixel value $AXV_{p\times(r-1)+2}$ from the concurrently-received pixel value $XV_{p\times(r-1)+3}$ to generate a differential data $DD_{p\times(r-1)+3}$. Thereafter, the subtraction section 222 repeats similar processes until it generates the aforementioned differential data $DD_{p\times r}$. As shown in FIG. 23, the subtraction section 222 sequentially outputs the generated differential data $DD_{p\times(r-1)+2}$ to $DD_{p\times r}$ to the near-instantaneous compression section 23.

Figure 24:
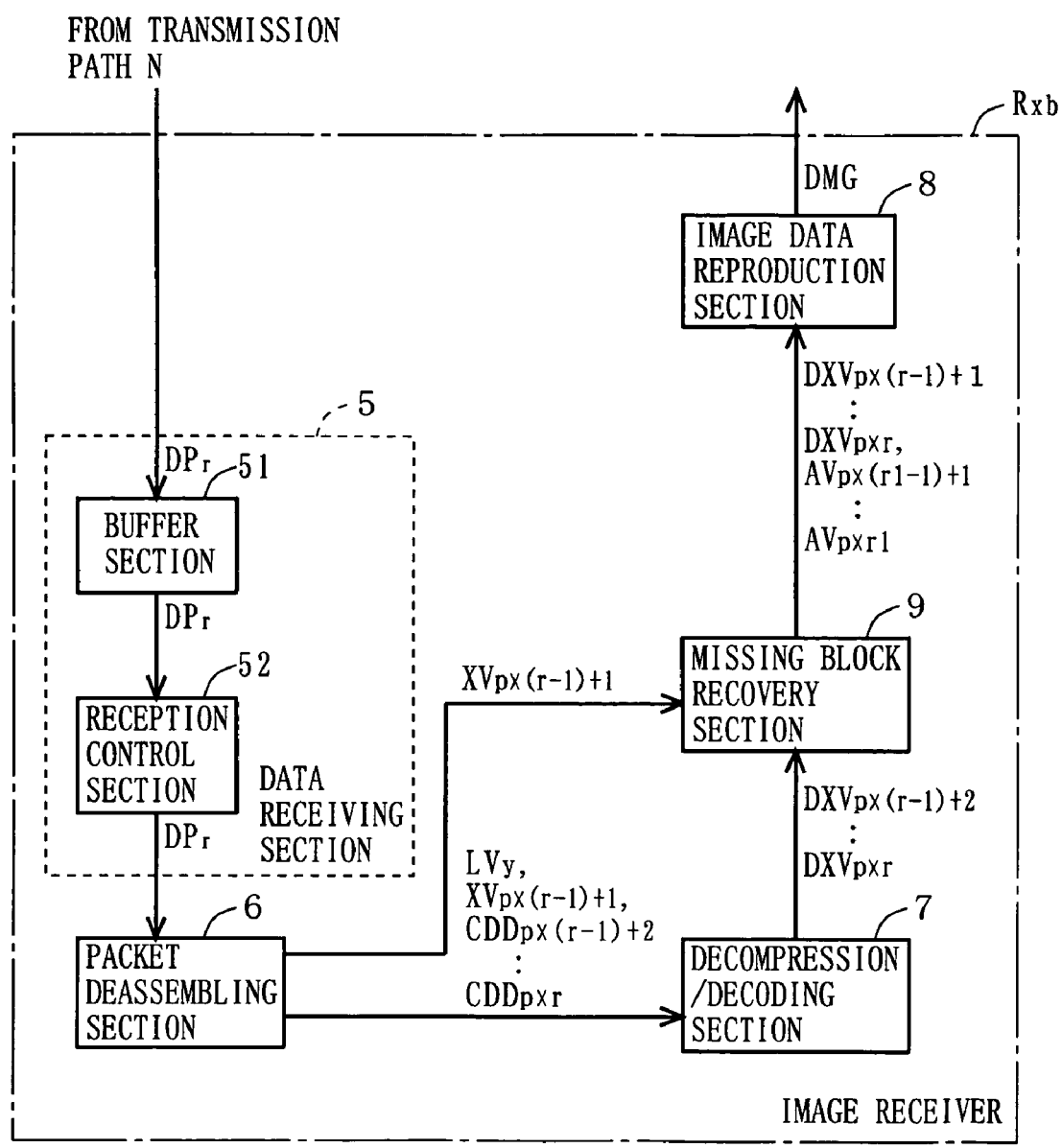
FIG. 24 is a block diagram illustrating the structure of a variant ("receiver Rxb") of the receiver Rxa shown in FIG. 15.

For various reasons such as transmission errors, it might be possible for the receiver Rxa to miss, i.e., fail to correctly receive, all of the data packet $DP_r$ which have been sent from the transmitter Tx. Next, with reference to FIG. 24, a variant of the receiver Rxa which can solve the above problem will be described. In the following description, the variant of the receiver Rxa will be referred to as a "receiver Rxb". As shown in FIG. 24, the receiver Rxb differs from the receiver Rxa in that the receiver Rxb includes a missing block recovery section 9 immediately before the image data reproduction section 8. Since the receiver Rxb is otherwise identical to the receiver Rxa, any component elements in the receiver Rxb which find their counterparts in the receiver Rxa are denoted by the same reference numerals as those employed in connection with the receiver Rxa, and the descriptions thereof are omitted.

The missing block recovery section 9 receives q sets of decoded pixel values $DXV_{p\times(r-1)+2}$ to $DXV_{p\times r}$ from the decompression/decoding section 7. Prior to the arrival of each set of decoded pixel values $DXV_{p\times(r-1)+2}$ to $DXV_{p\times r}$, the missing block recovery section 9 receives the pixel value $XV_{p\times(r-1)+1}$ from the packet deassembling section 6. Thus, granted that there is no transmission error or the like, the missing block recovery section 9 will first receive the pixel value $XV_1$ and the decoded pixel values $DXV_2$ to $DXV_p$. Subsequently, as the missing block recovery section 9 receives the $q^{th}$ set of decoded pixel values, all of the pixel value $XV_{p\times(r-1)+1}$ and the decoded pixel values $DXV_{p\times(r-1)+2}$ to $DXV_{p\times r}$ which are necessary for the reproduction of the image MG are on hand. Thus, when the pixel value $XV_{p\times(r-1)+1}$ and the set of decoded pixel values $DXV_{p\times(r-1)+2}$ to $DXV_{p\times r}$, which together compose one frame, are all correctly received, the missing block recovery section 9 sequentially outputs these values to the image data reproduction section 8.

However, due to the aforementioned transmission error or the like, the receiver Rxb may miss or fail to receive the pixel value $XV_{p\times(r-1)+1}$ and the decoded pixel values $DXV_{p\times(r-1)+2}$ to $DXV_{p\times r}$ to be generated from one or more data packets $DP_r$. In the following description, any data packets $DP_r$ which the receiver Rxb fails to receive will be referred to as "missing data packets $DDP_r$". In such cases, the missing block recovery section 9 is able to virtually reproduce the pixel values $XV_{p\times(r-1)+1}$ to $DXV_{p\times r}$ which have been contained in the missing data packet $DDP_r$ from the correctly-generated set of the pixel value $XV_{p\times(r-1)+1}$ and the decoded pixel values $DXV_{p\times(r-1)+2}$ to $DXV_{p\times r}$.

Figure 25:
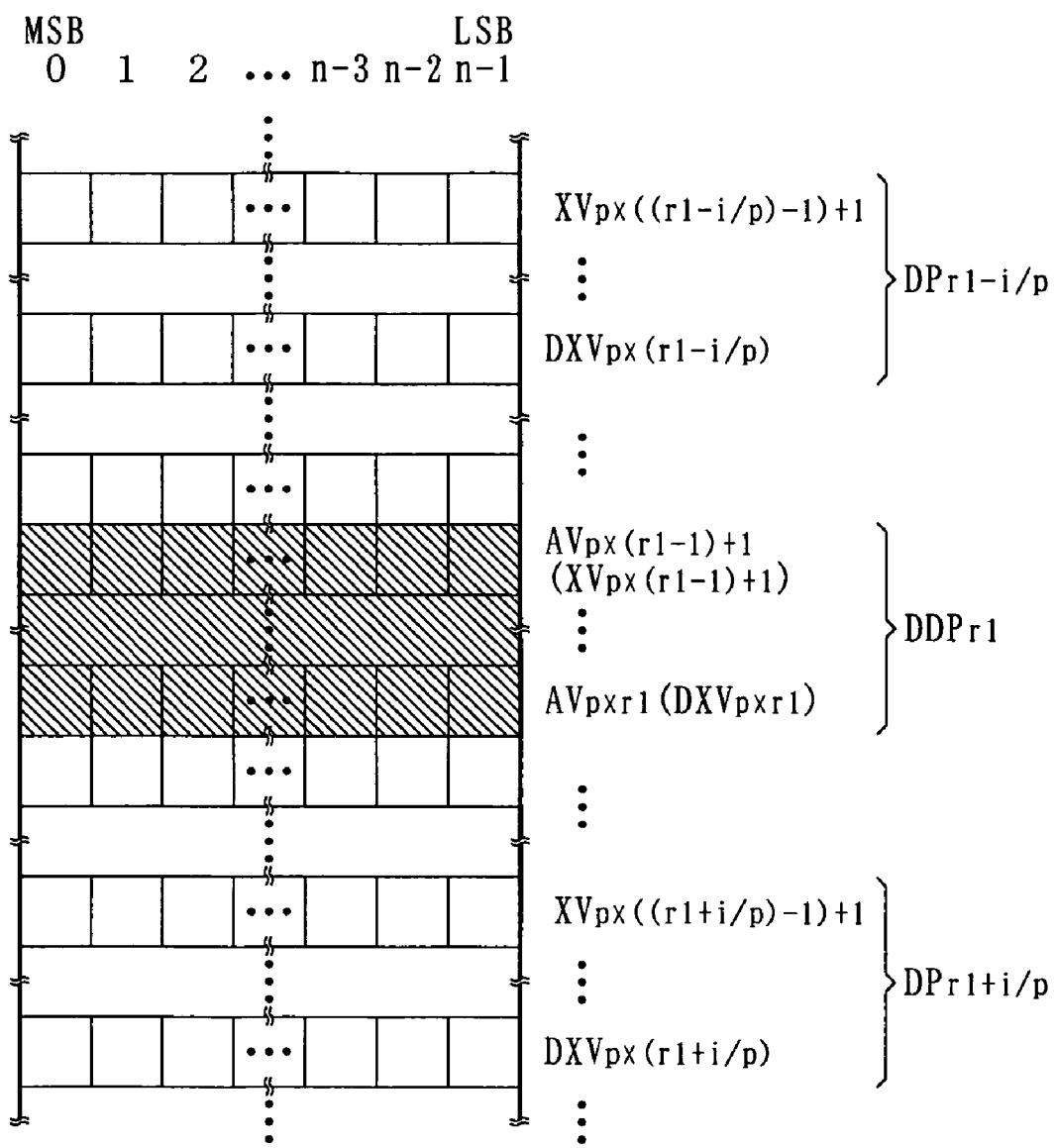
FIG. 25 is a diagram illustrating an exemplary process performed by a missing block recovery section 9 shown in FIG. 24.

For example, as shown in FIG. 25, it is assumed that a data packet $DP_{r1}$ which is generated as an $r_1^{th}$ data packet in the transmitter Tx happens to become a missing data packet $DDP_{r1}$, and that the receiver Rxb is correctly receiving all the other data packets $DP_r$. In this exemplary case, the missing block recovery section 9 first selects the pixel value $XV_{p\times((r1-i/p)-1)+1}$ and the decoded pixel values $DXV_{p\times((r1-i/p)-1)+2}$ to $DXV_{p\times(r1-i/p)}$ which have been generated from a data packet $DP_{r1-i/p}$ which lies (i/p) data packets before the missing data packet $DP_{r1}$. Note that the pixel value $XV_{p\times((r1-i/p)-1)+1}$ and the decoded pixel values $DXV_{p\times((r1-i/p)-1)+2}$ to $DXV_{p\times(r1-i/p)}$ are located one line above (along the longitudinal direction VD) the pixel value $XV_{p\times(r1-1)+1}$ and the decoded pixel values $DXV_{p\times(r1-1)+2}$ to $DXV_{p\times r1}$ which would have been generated from the missing data packet $DP_{r1}$. Furthermore, the missing block recovery section 9 selects the pixel value $XV_{p\times((r1+i/p)-1)+1}$ and the decoded pixel values $DXV_{p\times((r1+i/p)-1)+2}$ to $DXV_{p\times(r1+i/p)}$ which have been generated from a data packet $DP_{r1+i/p}$ which lies (i/p) after the missing data packet $DP_{r1}$. Note that the pixel value $XV_{p\times((r1+i/p)-1)+1}$ and the decoded pixel values $DXV_{p\times((r1+i/p)-1)+2}$ to $DXV_{p\times(r1+i/p)}$ are located one line below (along the longitudinal direction VD) the pixel value $XV_{p\times(r1-1)+1}$ and the decoded pixel values $DXV_{p\times(r1-1)+2}$ to $DXV_{p\times r1}$ which would have been generated from the missing data packet $DP_{r1}$.

Next, the missing block recovery section 9 assigns an average value $AV_{p\times(r1-1)+1}$ of the pixel value $XV_{p\times((r1-i/p)-1)+1}$ and the $XV_{p\times((r1+i/p)-1)+1}$ as the pixel value $XV_{p\times(r1-1)+1}$. Moreover, the missing block recovery section 9 assigns an average value $AV_{p\times(r1-1)+2}$ of the decoded pixel value $DXV_{p\times((r1-i/p)-1)+2}$ and $DXV_{p\times((r1+i/p)-1)+2}$ as the decoded pixel value $XV_{p\times(r1-1)+2}$. Thereafter, similar average values $AV_{p\times(r1-1)+3}$ to $AV_{p\times r1}$ are assigned as the decoded pixel values $DXV_{p\times(r1-1)+2}$ to $DXV_{p\times r1}$. Instead of the pixel value $XV_{p\times(r-1)+1}$ and the decoded pixel values $DXV_{p\times(r-1)+2}$ to $DXV_{p\times r}$ which were never obtained, the missing block recovery section 9 outputs the average values $AV_{p\times(r1-1)+1}$ to $AV_{p\times r1}$ which have virtually been reproduced in the above manner to the image data reproduction section 9. Based on the above-described average values $AV_{p\times(r1-1)+1}$ to $AV_{p\times r1}$ as well as the pixel value $XV_{p\times(r-1)+1}$ and the decoded pixel values $DXV_{p\times(r-1)+2}$ to $DXV_{p\times r}$ which have been generated from all the data packets $DP_r$ except for the missing data packet $DDP_{r1}$, the image data reproduction section 9 generates reproduced image data $RTD_2$ which is similar to the aforementioned reproduced image data $RTD_1$.

The reproduced image data $RTD_2$ and the aforementioned reproduced image data $RTD_1$ are substantially identical (i.e., indistinguishable to the human eye) for the following reasons. The transmitter Tx performs DPCM encoding and near-instantaneous compression on the basis of the data blocks $DB_r$, so that the missing data packet $DDP_r$ does not exert any influence on the near-instantaneous decompression and DPCM decoding performed for the other data packets $DP_r$. Furthermore, each data block $DB_r$ only includes p pixel values $XV_{p\times(r-1)+1}$ to $DXV_{p\times r}$. Therefore, the reproduced image data $RTD_2$ containing the aforementioned average value $AV_{p\times(r-1)+1}$ to $AV_{p\times r1}$ would hardly present any difference to the human eye from the reproduced image data $RTD_1$.

As can be seen from the above, in accordance with the receiver Rxb, any missing data packets $DDP_r$ can be approximately recovered based on the other data packets $DP_r$, thereby solving the aforementioned problem and generating reproduced image data $RTD_2$ which is visually acceptable.

Alternatively, the missing block recovery section 9 may utilize, in order to deal with the missing data packet $DDP_r$, the pixel value $XV_{p\times(r-1)+1}$ and a set of decoded pixel values $DXV_{p\times(r-1)+2}$ to $DXV_{p\times r}$ from one line above or below (along the longitudinal direction VD) the missing data packet $DDP_r$. Further alternatively, the missing block recovery section 9 may utilize the pixel value $XV_{p\times(r-1)+1}$ and a set of decoded pixel values $DXV_{p\times(r-1)+2}$ to $DXV_{p\times r}$ from one pixel value right or left (along the width direction HD) of the missing data packet $DDP_r$. In particular, in the case where moving pictures are represented by the image data TD, the pixel value $XV_{p\times(r-1)+1}$ and a set of decoded pixel values $DXV_{p\times(r-1)+2}$ to $DXV_{p\times r}$ which are generated from a data packet $DP_r$ pertaining to a preceding and/or succeeding frame may be employed in the receiver Rxb.

Figure 26:
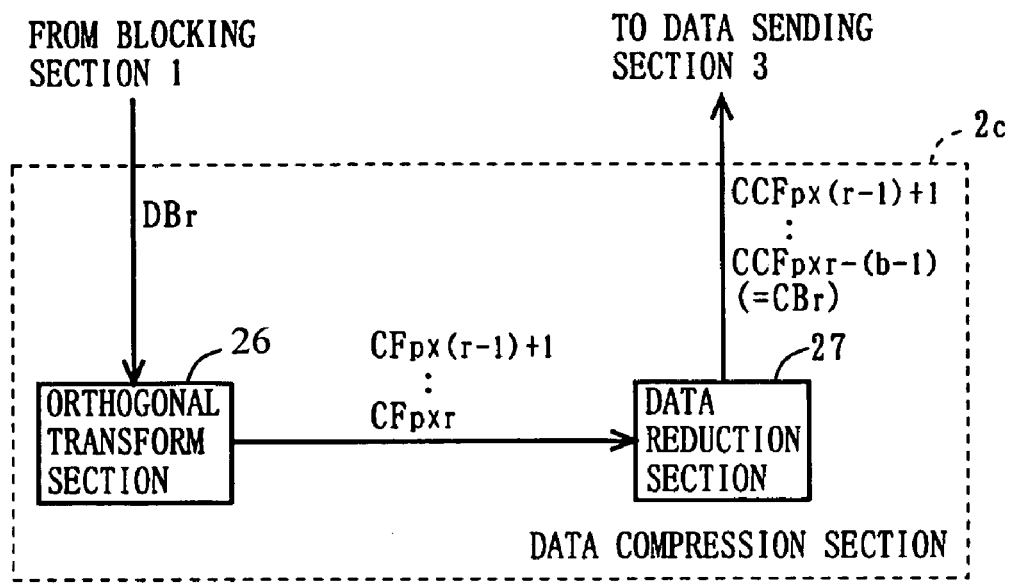
FIG. 26 is a block diagram illustrating a second implementation (a "data compression section 2c") of the data compression section 2 shown in FIG. 1.

Next, with reference to FIG. 26, a second implementation of the data compression section 2 shown in FIG. 1 will be described. In the following description, the second implementation of the data compression section 2 will be referred to as a "data compression section 2c". In order to perform the aforementioned second compression process, the data compression section 2c includes an orthogonal transform section 26 and a data reduction section 27, as shown in FIG. 26.

Figure 27:
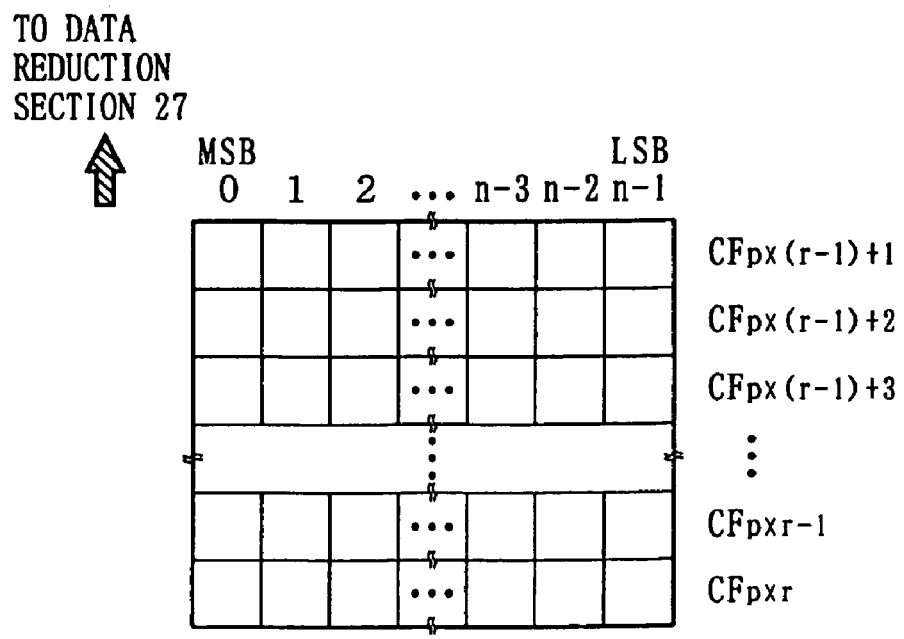
FIG. 27 is a diagram illustrating a format of coefficients $CF_{p\times(r-1)+1}$ to $CF_{p\times r}$ which are outputted from an orthogonal transform section 26 shown in FIG. 26.

Next, the second compression process which is performed by the data compression section 2c will be specifically described. Data blocks $DB_r$ from the aforementioned blocking section 1 (see FIG. 1) are received by an orthogonal transform section 26 in the data compression section 2c. The orthogonal transform section 26 performs an orthogonal transform to multiply the received set of pixel values $XV_{p\times(r-1)+1}$ to $XV_{p\times r}$ by a predetermined orthogonal transform matrix, thereby generating a set of coefficients $CF_{p\times(r-1)+1}$ to $CF_{p\times r}$. As shown in FIG. 27, these coefficients $CF_{p\times(r-1)+1}$ to $CF_{p\times r}$ which are derived through the orthogonal transform are expressed in n bits, as are the pixel values $XV_{p\times(r-1)+1}$ to $XV_{p\times r}$. Furthermore, the coefficients $CF_{p\times(r-1)+1}$ to $CF_{p\times r}$ represent respectively different frequency components in the frequency domain. The above set of coefficients $CF_{p\times(r-1)+1}$ to $CF_{p\times r}$ are outputted from the orthogonal transform section 26 to the data reduction section 27.

Hereinafter, an Hadamard transform will be described as an example of the aforementioned orthogonal transform, and the process performed by the orthogonal transform section 26 will be more specifically described. As described earlier, each data block $DB_r$ includes p pixel values $XV_{p\times(r-1)+1}$ to $XV_{p\times r}$. In the following description, p is conveniently assumed to be 16. Under this assumption, the orthogonal transform section 26 retains a (16×16) Hadamard transform matrix H as expressed by eq. 1 below:

$$H = \frac{1}{\sqrt{16}} \begin{bmatrix} 1 & 1 & 1 & 1 & 1 & 1 & 1 & 1 & 1 & 1 & 1 & 1 & 1 & 1 & 1 & 1 \\ 1 & 1 & 1 & 1 & 1 & 1 & 1 & 1 & -1 & -1 & -1 & -1 & -1 & -1 & -1 & -1 \\ 1 & 1 & 1 & 1 & -1 & -1 & -1 & -1 & -1 & -1 & -1 & -1 & 1 & 1 & 1 & 1 \\ 1 & 1 & 1 & 1 & -1 & -1 & -1 & -1 & 1 & 1 & 1 & 1 & -1 & -1 & -1 & -1 \\ 1 & 1 & -1 & -1 & -1 & -1 & 1 & 1 & 1 & 1 & -1 & -1 & -1 & -1 & 1 & 1 \\ 1 & 1 & -1 & -1 & -1 & -1 & 1 & 1 & -1 & -1 & 1 & 1 & 1 & 1 & -1 & -1 \\ 1 & 1 & -1 & -1 & 1 & 1 & -1 & -1 & -1 & -1 & 1 & 1 & -1 & -1 & 1 & 1 \\ 1 & 1 & -1 & -1 & 1 & 1 & -1 & -1 & 1 & 1 & -1 & -1 & 1 & 1 & -1 & -1 \\ 1 & -1 & -1 & 1 & 1 & -1 & -1 & 1 & 1 & -1 & -1 & 1 & 1 & -1 & -1 & 1 \\ 1 & -1 & -1 & 1 & 1 & -1 & -1 & 1 & -1 & 1 & 1 & -1 & -1 & 1 & 1 & -1 \\ 1 & -1 & -1 & 1 & -1 & 1 & 1 & -1 & -1 & 1 & 1 & -1 & 1 & -1 & -1 & 1 \\ 1 & -1 & -1 & 1 & -1 & 1 & 1 & -1 & 1 & -1 & -1 & 1 & -1 & 1 & 1 & -1 \\ 1 & -1 & 1 & -1 & -1 & 1 & -1 & 1 & 1 & -1 & 1 & -1 & -1 & 1 & -1 & 1 \\ 1 & -1 & 1 & -1 & -1 & 1 & -1 & 1 & -1 & 1 & -1 & 1 & 1 & -1 & 1 & -1 \\ 1 & -1 & 1 & -1 & 1 & -1 & 1 & -1 & 1 & -1 & 1 & -1 & 1 & -1 & 1 & -1 \\ 1 & -1 & 1 & -1 & 1 & -1 & 1 & -1 & -1 & 1 & -1 & 1 & -1 & 1 & -1 & -1 \end{bmatrix} \quad \text{eq. 1}$$

For conciseness, the pixel values $XV_{16\times r-15}$ to $XV_{16\times r}$ contained in the currently-received data block $DB_r$ are represented as a matrix expressed by eq. 2 below. The coefficients $CF_{16\times r-15}$ to $CF_{16\times r}$ obtained through the Hadamard transform are represented as a matrix expressed by eq. 3 below.

x=[pixel value $XV_{16\times r-15}$, pixel value $XV_{16\times r-14}$, ... , pixel value $XV_{16\times r}$]$^t$   eq. 2 y=[coefficient $CF_{16\times r-15}$, coefficient $CF_{16\times r-14}$, ... , coefficient $CF_{16\times r}$]$^t$   eq. 3

In eq. 2 and eq. 3, "t" means transpose.

Under the definitions expressed by eq. 1 to eq. 3 above, the orthogonal transform section 26 multiplies the Hadamard transform matrix H by the matrix "x" beginning from the right side thereof, as expressed by eq. 4 below.

$y = H \times x / 4$   eq. 4

The resultant coefficient $CF_{16\times r-15}$ is an integer in the range from 0 to 255, and the resultant coefficients $CF_{16\times r-14}$ to $CF_{16\times r}$ are integers in the range from −127 to 127. Therefore, these coefficients can all be expressed in n bits as mentioned above. According to the Hadamard transform matrix H expressed by eq. 1 above, the coefficient $CF_{16\times r-15}$ represents a component associated with the lowest frequency region. Likewise, the coefficients $CF_{16\times r-15}$ to $CF_{16\times r}$ having greater suffix values represent components which are associated with respectively higher frequency regions.

As described earlier, the data reduction section 27 sequentially receives sets of coefficients $CF_{p\times(r-1)+1}$ to $CF_{p\times r}$. From each received set of coefficients $CF_{p\times(r-1)+1}$ to $CF_{p\times r}$, the data reduction section 27 deletes b coefficients $CF_{p\times r-b}$ to $CF_{p\times r}$ which represent components associated with predetermined high-frequency regions, thereby generating compressed coefficients $CF_{p\times(r-1)+1}$ to $CCF_{p\times r-(b-1)}$. Herein, "b" is a natural number in the range from 1 to n.

Figure 28:
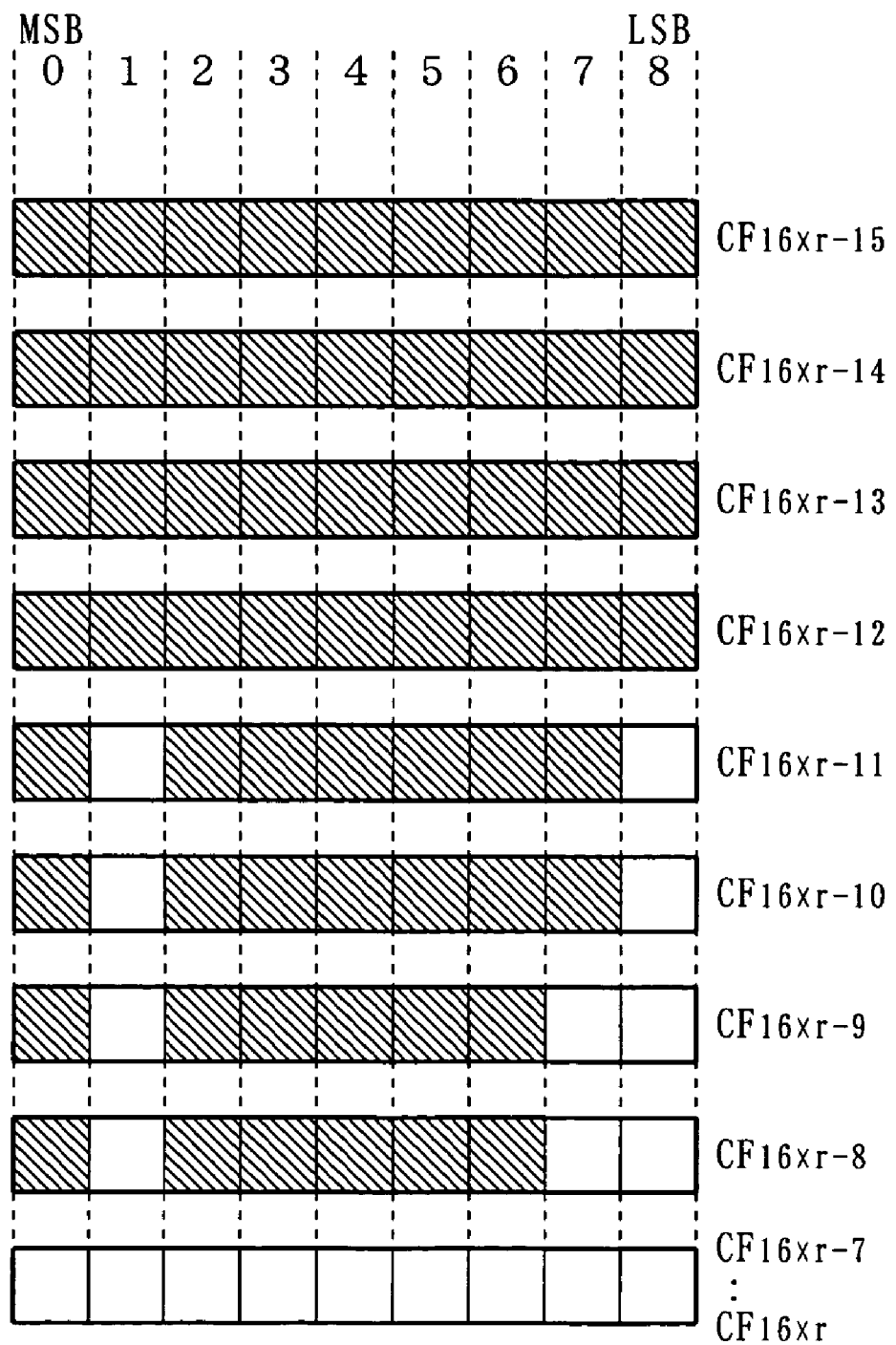
FIG. 28 is a diagram illustrating a portion of the process performed by a data reduction section 27 shown in FIG. 26.

According to the present embodiment of the invention, as shown in FIG. 28, those of the coefficients $CF_{p\times(r-1)+1}$ to $CF_{p\times r}$ which are to be deleted are predetermined. FIG. 28 shows example coefficients CF which are to be deleted in an exemplary case where n=8 and p=16. In principle, among the currently-received coefficients $CF_{16\times r-15}$ to $CF_{16\times r}$, the data reduction section 27 leaves intact those which represent predetermined low-frequency components, while deleting those which represent any higher frequency components. In the exemplary case shown in FIG. 28, the coefficients $CF_{16\times r-15}$ to $CF_{16\times r-12}$, which represent relatively low-frequency components, are left intact (see the hatched portions). On the other hand, the coefficients $CF_{16\times r-7}$ to $CF_{16\times r}$ representing relatively high frequency components are deleted. The reason why all of the coefficients $CF_{16\times r-7}$ to $CF_{16\times r}$ representing relatively high-frequency components can be deleted is as follows. In a set of coefficients (i.e., matrix y (as represented by eq. 3)) which are produced through the aforementioned orthogonal transform, the greater coefficients are generally concentrated in the low frequency regions, whereas the smaller coefficients are generally concentrated in the high frequency regions, due to certain correlations residing in the image MG.

According to the present embodiment of the invention, the next bit to the MSB and the least significant bit (hereinafter referred to as "LSB") are deleted from both coefficients $CF_{16\times r-11}$ and $CF_{16\times r-10}$. Furthermore, the next bit to the MSB and the lower two bits are deleted from both coefficients $CF_{16\times r-9}$ and $CF_{16\times r-8}$. More specifically, as shown in FIG. 29, the LSBs in the coefficients $CF_{16\times r-11}$ to $CF_{16\times r-8}$ are all deleted. If any of the coefficients $CF_{16\times r-11}$ to $CF_{16\times r-8}$ has a positive value and the next bit to the MSB that is to be deleted is "1", then the other bits are all set to "1", so the resultant compressed coefficient $CCF_{16\times r-11}$ to $CCF_{16\times r-8}$ will be a bit sequence composed only of "1". If any of the coefficients $CF_{16\times r-11}$ to $CF_{16\times r-8}$ has a positive value and the next bit to the MSB that is to be deleted is "0", then all the other bits are left intact. If any of the coefficients $CF_{16\times r-11}$ to $CF_{16\times r-8}$ has a negative value and the next bit to the MSB that is to be deleted is "1", then all the other bits are set to "0". If any of the coefficients $CF_{16\times r-11}$ to $CF_{16\times r-8}$ has a negative value and the next bit to the MSB that is to be deleted is "0", then all the other bits are left intact.

The present embodiment is not limited to the exemplary cases shown in FIGS. 28 and FIG. 29. It is possible to determine which one of the coefficients $CF_{p\times(r-1)+1}$ to $CF_{p\times r}$ are to be deleted and which bit(s) thereof is to be deleted in accordance with the band width of the transmission path N, the image quality which is required on the receiver Rx side, and the like.

In the above-described manner, the data reduction section 27 generates a set of compressed coefficients $CCF_{p\times(r-1)+1}$ to $CCF_{p\times r-(b-1)}$, which are outputted to the data sending section 3 as the aforementioned compressed block $CB_r$.

As shown in FIG. 1, the data sending section 3 includes the buffer section 31 and the sending control section 32. The buffer section 31 stores the set of compressed coefficients $CCF_{p\times(r-1)+1}$ to $CCF_{p\times r-(b-1)}$ as a fixed-length compressed block $CB_r$. As in the first implementation, since the set of compressed coefficients $CCF_{p\times(r-1)+1}$ to $CCF_{p\times r-(b-1)}$ is of a fixed length, any delay time incurred will be minimized. The sending control section 32 receives the set of compressed coefficients $CCF_{p\times(r-1)+1}$ to $CCF_{p\times r-(b-1)}$ from the buffer section 31, and sends these onto the transmission path N. As shown in FIG. 1, the set of compressed coefficients $CCF_{p\times(r-1)+1}$ to $CCF_{p\times r-(b-1)}$, as an example compressed block $CB_r$, are transmitted via the transmission path N so as to be received by the receiver RX.

Figure 30:
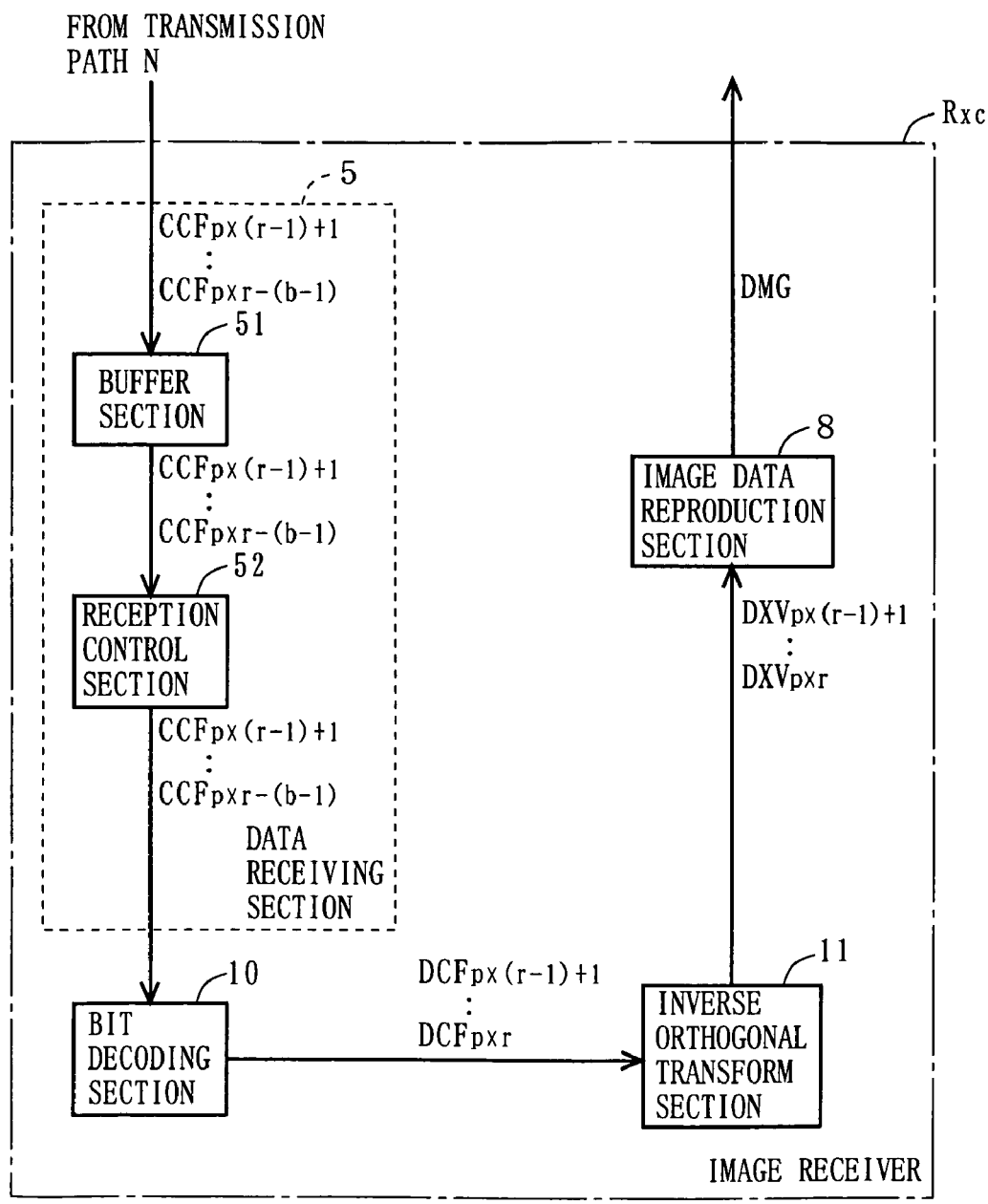
FIG. 30 is a block diagram illustrating a second implementation (a "receiver Rxc") of the receiver Rx shown in FIG. 1.

The receiver Rx subjects the received data packet $DP_r$ to predetermined processing to reproduce the image data TD. Hereinafter, a second implementation of the receiver Rx of FIG. 1 will be described with reference to FIG. 30. In the following description, the second implementation of the receiver Rx will be referred to as a "receiver Rxc". The receiver Rxc differs from the above-described receiver Rxa (see FIG. 15) in that the receiver Rxc includes a bit decoding section 10 and an inverse orthogonal transform section 11 instead of the packet deassembling section 6 and the decompression/decoding section 7. Since the receiver Rxc is otherwise identical to the receiver Rxa, any component elements in FIG. 30 which find their counterparts in FIG. 15 are denoted by the same reference numerals as those employed in connection with the receiver Rxa, and the descriptions thereof are omitted.

Next, the reproduction processing for the image data TD which is performed by the receiver Rxc having the aforementioned structure will be described in detail. In the data receiving section 5, the buffer section 51 stores a set of compressed coefficients $CCF_{p\times(r-1)+1}$ to $CCF_{p\times r-(b-1)}$ from the transmission path N. The buffer section 51, which is only required to store the set of fixed-length compressed coefficients $CCF_{p\times(r-1)+1}$ to $CCF_{p\times r-(b-1)}$, as is the case with the buffer section 31, contributes to the minimization of the delay time. After the buffering, the compressed coefficients $CCF_{p\times(r-1)+1}$ to $CCF_{p\times r-(b-1)}$ are outputted to the bit decoding section 10 via the reception control section 52.

The bit decoding section 10 performs an inverse process of the process which is performed by the data reduction section 27 so as to generate the decompressed coefficients $DCF_{p\times(r-1)+1}$ to $DCF_{p\times r}$ from the compressed coefficients $CCF_{p\times(r-1)+1}$ to $CCF_{p\times r-(b-1)}$, which are then outputted to the inverse orthogonal transform section 11. Herein, the decompressed coefficients $DCF_{p\times(r-1)+1}$ to $DCF_{p\times r}$ have such small differences from the coefficients $CF_{p\times(r-1)+1}$ to $CF_{p\times r}$ that the decoded pixel values $DXV_{p\times(r-1)+1}$ to $DXV_{p\times r}$ (described later) and the pixel values $XV_{p\times(r-1)+1}$ to $XV_{p\times r}$ would hardly present any difference to the human eye. To describe the bit restoration process more specifically, an average value of a bit sequence of 1 and/or 0, i.e., values which can be expressed in two bits, is added after the LSB of each of the compressed coefficients $CCF_{16\times r-9}$ and $CCF_{16\times r-8}$. Furthermore, in the case where the MSB in the compressed coefficient $CCF_{16\times r-9}$ and/or $CCF_{16\times r-8}$ has a positive value, "0" is inserted after the MSB of that compressed coefficient; otherwise, "1" is inserted after the MSB of that compressed coefficient. Thus, the decompressed coefficients $DCF_{16\times r-9}$ and $DCF_{16\times r-8}$ are generated. Moreover, a bit "1" or "0" is added after the LSB of each of the compressed coefficients $CCF_{16\times r-11}$ and $CCF_{16\times r-10}$. Furthermore, in the case where the MSB in the compressed coefficient $CCF_{16 \times r-11}$ and/or $CCF_{16 \times r-10}$ has a positive value, "0" is inserted after the MSB of that compressed coefficient; otherwise, "1" is inserted after the MSB of that compressed coefficient. Thus, the decompressed coefficients $DCF_{16 \times r-11}$ and $DCF_{16 \times r-10}$ are generated. In order to deal with the coefficients $CF_{16 \times r-7}$ and $DCF_{16 \times r}$ from which all bits have been deleted, the bit decoding section 10 generates decompressed coefficients $DCF_{16 \times r-7}$ and $DCF_{16 \times r}$ whose eight bits are all "0".

The inverse orthogonal transform section 11 performs an inverse orthogonal transform, i.e., an inverse process of the process which is performed by the orthogonal transform section 26, to multiply an inverse matrix of the aforementioned orthogonal transform matrix by the received decompressed coefficients $DCF_{p \times (r-1)+1}$ to $DCF_{p \times r}$, thereby generating a set of decoded pixel values $DXV_{p \times (r-1)+1}$ to $DXV_{p \times r}$. The resultant decoded pixel values $DXV_{p \times (r-1)+1}$ to $DXV_{p \times r}$, which hardly present any difference to the human eye as compared to the pixel values $XV_{p \times (r-1)+1}$ to $XV_{p \times r}$, are outputted to the image data reproduction section 8.

As described earlier, the present embodiment of the invention is directed to the case where an Hadamard transform is performed. Next, the processing to be performed by the inverse orthogonal transform section 11 in this specific case will be described more specifically. The following description also assumes that p=16. Under this assumption, the inverse orthogonal transform section 11 retains an inverse transform matrix $H^{-1}$ of eq. 1 above. For conciseness, the currently-received decompressed coefficients $DCF_{p \times (r-1)+1}$ to $DCF_{p \times r}$ are represented as a matrix expressed by eq. 5 below. The decoded pixel values $DXV_{p \times (r-1)+1}$ to $DXV_{p \times r}$ which are obtained through the inverse transform of the Hadamard transform are represented as a matrix expressed by eq. 6 below.

$y=[\text{decompressed coefficient } CF_{16 \times r-15}, \ldots, \text{decompressed coefficient } CF_{16 \times r}]^t$ eq. 5

$z=[\text{decoded pixel value } XV_{16 \times r-15}, \ldots, \text{decoded pixel value } XV_{16 \times r}]^t$ eq. 6

In eq. 5 and eq. 6, "t" means transpose.

Under the definitions expressed by eq. 5 and eq. 6 above, the inverse orthogonal transform section 11 multiplies the matrix "y" by the inverse transform matrix $H^{-1}$ of the Hadamard transform matrix H beginning from the right side thereof, as expressed by eq. 7 below.

$z = H^{-1} \times y \times 4$ eq. 7

As a result of the above processing, the image data reproduction section 8 sequentially receives q sets of decoded pixel values $DXV_{p \times (r-1)+1}$ to $DXV_{p \times r}$. The image data reproduction section 8 generates a reproduced image data RTD similar to that shown in FIG. 20.

As described above, in accordance with the second implementation of the data compression section 2c, too, encoding and compression are performed for the fixed-length data block $DB_r$ composed of p pixel values $XV_{p \times (r-1)+1}$ to $XV_{p \times r}$ arranged in line along the width direction HD, it is possible to minimize any delay time elapsing prior to the generation of the reproduced image data RTD in the receiver Rxc.

Although the above illustration is directed to the case where an Hadamard transform is performed in the orthogonal transform section 26, the present invention is not limited thereto. Alternatively, the orthogonal transform section 26 may perform a DCT or discrete sine transform (DST).

"First Application"

Figure 31:
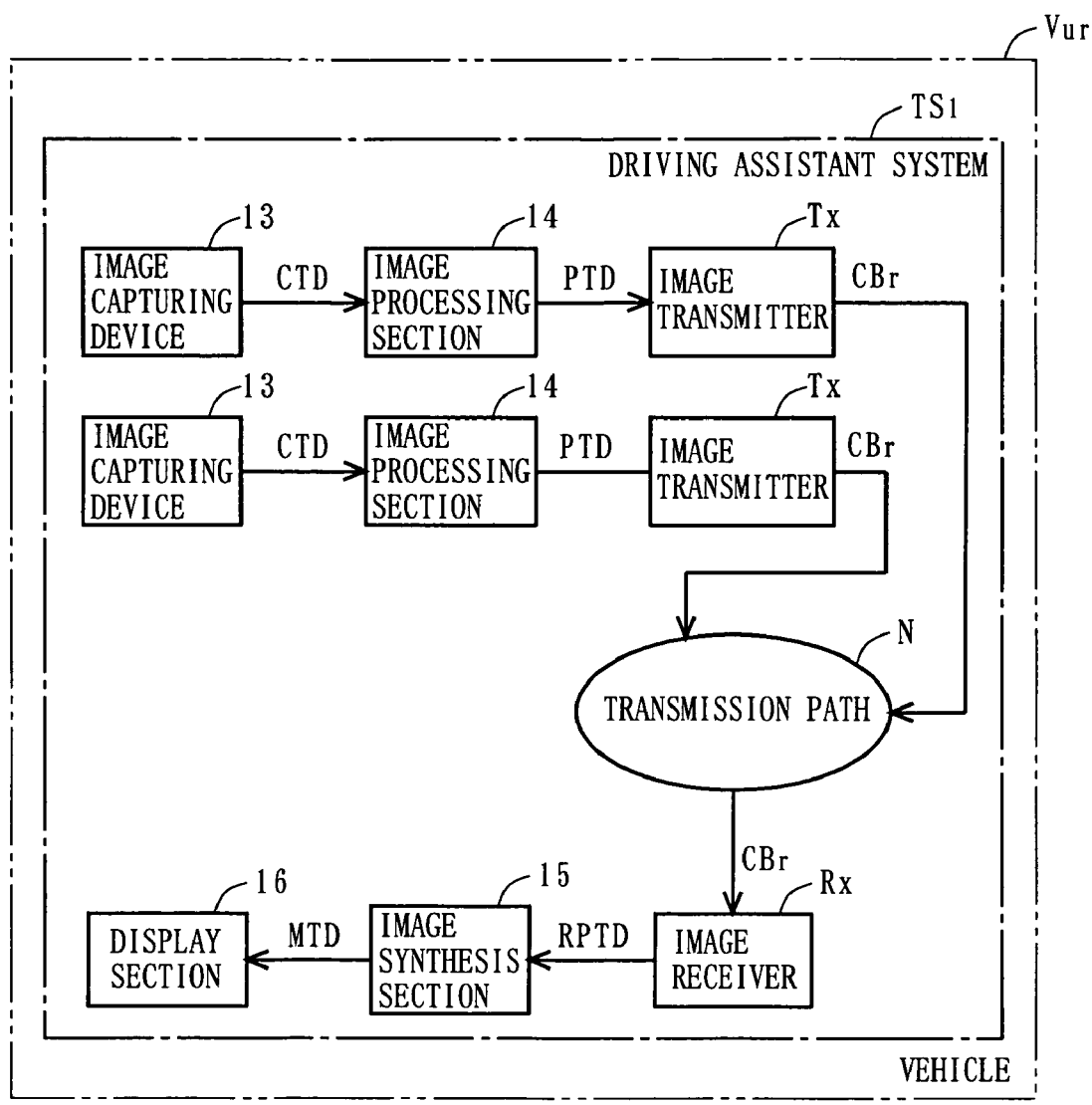
FIG. 31 is a block diagram illustrating the overall configuration of a driving assistant system $TS_1$ incorporating transmitters Tx and receiver Rx as shown in FIG. 1.

In recent years, there has been plenty of work directed to the research and development of driving assistant systems for assisting a driver in his/her driving of a vehicle by capturing an image of the surroundings of the vehicle via image capturing devices and providing such an image to the driver. Next, a driving assistant system $TS_1$ incorporating the above-described transmitter Tx and receiver Rx will be described. FIG. 31 is a block diagram illustrating the overall configuration of the driving assistant system $TS_1$. The driving assistant system $TS_1$ shown in FIG. 31 includes two image capturing devices 13, two image processing sections 14, two transmitters Tx, a transmission path N, a receiver Rx, an image synthesis section 15, and a display section 16. The driving assistant system $TS_1$ is mounted in a vehicle $V_{ur}$.

Figure 32:
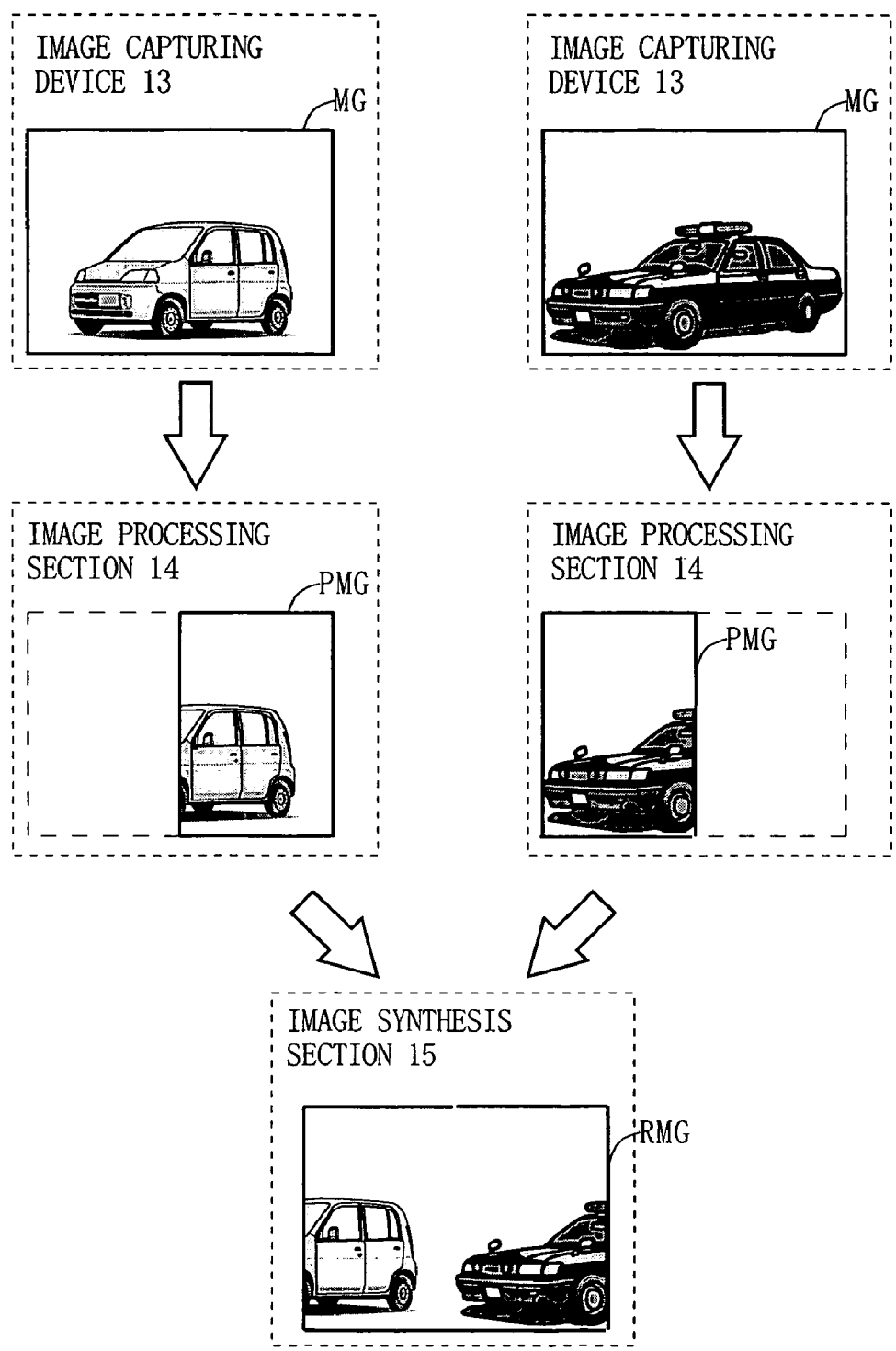
FIG. 32 is a diagram illustrating a process performed by the driving assistant system $TS_1$ shown in FIG. 31.

The image capturing devices 13, each of which is disposed so as to be able to capture an image of an area in the rear of the vehicle $V_{ur}$, capture images of respectively different regions in the rear of the vehicle $V_{ur}$, and generate captured image data CTD representing the captured images MG (see FIG. 32). After each image capturing device 13, an implementation of the aforementioned image processing section 14 is coupled so as to receive the respective captured image data CTD from that image capturing device 13.

As shown in FIG. 32, from the received image data CTD, each image processing section 14 selects a number of pixels composing a partial image PMG representing a predetermined portion of the image indicative of the surroundings of the vehicle, thereby generating a partial image data PTD (this process being referred to as "clipping"). Herein, it is conveniently assumed that each partial image data PTD is of the format shown in FIG. 3 in the present embodiment of the invention. After each image processing section 14, an implementation of the aforementioned transmitter Tx is coupled so as to receive the respective image data PTD from that image processing section 14.

Each transmitter Tx performs the processing described in any of the earlier embodiments of the invention for the partial image data PTD it receives, thereby generating compressed block $CB_r$. The respective compressed blocks $CB_r$ are transmitted to the receiver Rx via the transmission path N.

The receiver Rx performs the processing described in any of the earlier embodiments of the invention for each received compressed block $CB_r$, thereby generating reproduced partial image data RPTD. Herein, as will be appreciated from the foregoing description, each reproduced partial data RPTD represents a reproduced partial image RMG which is substantially the same as the image MG represented by each partial image data PTD (as shown in FIG. 32). The respective reproduced partial data RPTD are outputted to the subsequent image synthesis section 15.

The image synthesis section 15 performs a synthesis process for both received reproduced partial image data RPTD to generate a merged image data MTD representing a single synthesized image MMG which is composed of the two partial images PMG. The merged image data MTD is outputted to the display section 16.

The display section 16 subjects the received merged image data MTD to display processing, thereby providing the aforementioned synthesized image MMG to the driver of the vehicle $V_{ur}$.

Thus, in accordance with the present driving assistant system $TS_1$, each image processing section 14 generates a partial image data PTD which is required on the receiver Rx side, so that the amount of data which is transmitted over the transmission path N can be minimized.

Moreover, in accordance with the transmitters Tx and the receiver Rx, as described earlier, the delay time which is incurred after the generation of captured image data CTD by the image capturing devices 13 and before the display processing of the merged image data MTD by the display section 16 can be minimized. By incorporating the transmitters Tx and the receiver Rx having such characteristics in the driving assistant system $TS_1$, a driver is enabled to grasp the surroundings of the vehicle $V_{ur}$ in real time. As a result, the driver can drive the vehicle $V_{ur}$ with increased safety.

Figure 33:
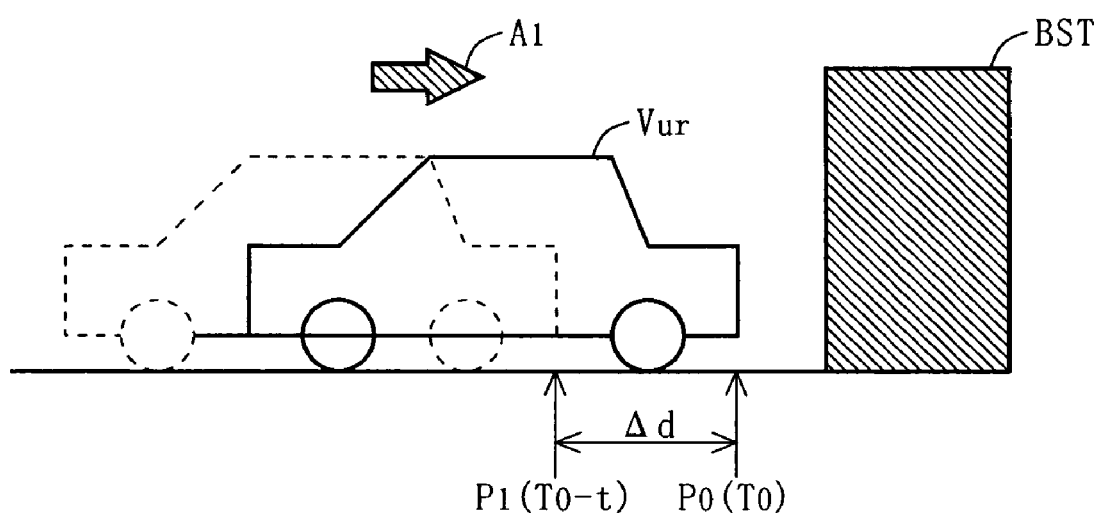
FIG. 33 is a schematic diagram illustrating technological effects associated with the driving assistant system $TS_1$ shown in FIG. 31.

Next, with reference to FIG. 33, the above-described technological effects will be more specifically described. In FIG. 33, the vehicle $V_{ur}$ is moving "in reverse" (i.e., backing up) in a direction shown by arrow $A_1$. An obstacle BST is present at a distance from the vehicle $V_{ur}$ in the direction (indicated by arrow $A_1$) in which the vehicle $V_{ur}$ is moving. The driver will try to drive the vehicle $V_{ur}$ so as not to collide with the obstacle BST by checking the synthesized image MTD which is displayed on the display section 16. In FIG. 33, a point $P_0$ is a position where the rear end of the vehicle $V_{ur}$ passes at the current time $T_0$. Given that the aforementioned delay time is DT, the synthesized image MTD which is displayed on the display section 16 at the current time $T_0$ is an image generated based on the captured image data CTD which was generated by the image capturing devices 13 at a time $(T_0-t)$.

In FIG. 33, a point $P_1$ is a position where the rear end of the vehicle $V_{ur}$ passed at the aforementioned time $(T_0-t)$, i.e., where the captured image data CTD was generated. Herein, the distance $\Delta d$ between the points $P_0$ and $P_1$ is determined by the velocity SP of the vehicle $V_{ur}$ and the delay time DT, as expressed by eq. 8 below.

$$\Delta d = SP \times DT \qquad \text{eq. 8}$$

Assuming that the vehicle $V_{ur}$ moves at a constant velocity, as seen from eq. 8 above, the distance $\Delta d$ increases as the delay time DT increases. If the delay time DT=0, then the distance $\Delta d=0$, so that the points $P_0$ and $P_1$ will coincide. If there is substantial delay time DT, on the other hand, the vehicle $V_{ur}$ may collide into the obstacle BST before the display section 16 displays the sight of the collision in vain. From this perspective, it can be seen how useful it is to incorporate transmitters Tx and a receiver Rx having a sufficiently small delay time DT in the driving assistant system $TS_1$.

In the above application, the driving assistant system $TS_1$ comprises two sets of image capturing devices 13, image processing sections 14, and image transmitters Tx. However, the present invention is not limited to such a configuration. The driving assistant system $TS_1$ may comprise one or more set of such elements. Although the above image capturing devices 13 are illustrated as being capable of capturing images of objects at the rear of the vehicle $V_{ur}$, the image capturing devices 13 may alternatively be fixed on the vehicle $V_{ur}$ so as to be capable of capturing images of objects at the front and/or sides of the vehicle $V_{ur}$, as necessary.

While the missing block recovery section 9 in the earlier-described embodiment is illustrated as approximately recovering the pixel values $XV_{p \times (r-1)+1}$ to $DXV_{p \times r}$ which have been contained in a missing data packet $DDP_r$ from a correctly-generated set of the pixel value $XV_{p \times (r-1)+1}$ and the decoded pixel values $DXV_{p \times (r-1)+2}$ to $DXV_{p \times r}$, it may be more preferable in the driving assistant system $TS_1$ not to reproduce any missing data packets $DDP_r$, but simply "black out" that portion, for example, thereby warning the driver of the occurrence of the missing data packets $DDP_r$, because the driver is in need of accurate information concerning the surroundings of the vehicle $V_{ur}$.

"Second Application"

Figure 34:
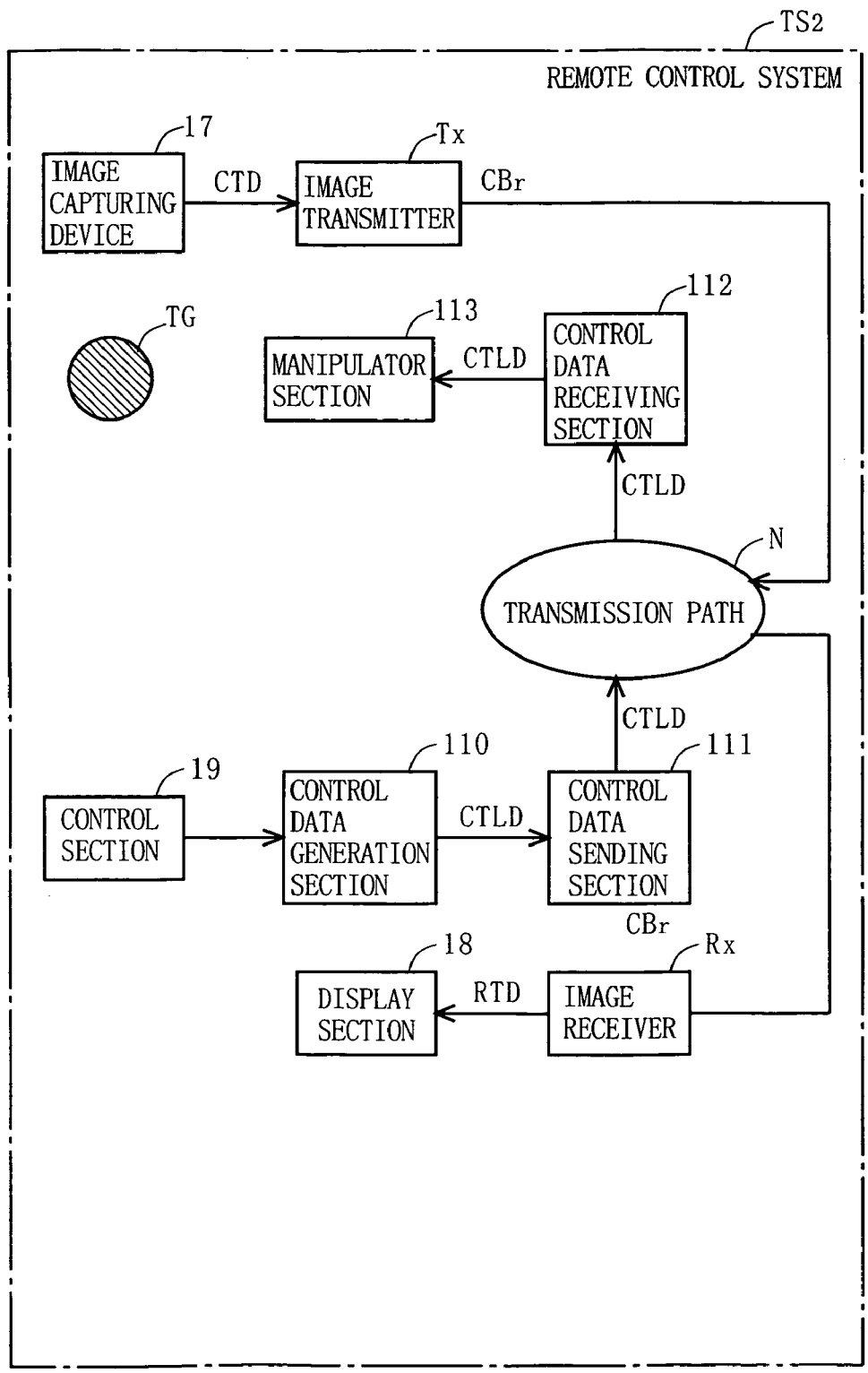
FIG. 34 is a block diagram illustrating the overall structure of a remote control system $TS_2$ incorporating a transmitter Tx and a receiver Rx as shown in FIG. 1.

In the field of FA (Factory Automation), there has been some research and development work on remote control systems for acting on an object via remote control. Next, a remote control system $TS_2$ incorporating the above-described transmitter Tx and the receiver Rx will be described. FIG. 34 is a block diagram illustrating the overall structure of the remote control system $TS_2$. The remote control system $TS_2$ of FIG. 34 includes an image capturing device 17, a transmitter Tx, a transmission path N, a receiver Rx, a display section 18, a control section 19, a control data generation section 110, a control data sending section 111, a control data receiving section 112, and a manipulator section 113. The remote control system $TS_2$ is employed to exert an action on an object TG.

The image capturing device 17, which is disposed in the neighborhood of the object TG, captures an image of the object TG, and generates captured image data CTD representing the captured image. The generated captured image data CTD is outputted to the transmitter Tx. The transmitter Tx subjects the received captured image data CTD to the processing which has been described in any of the foregoing embodiments of the invention, thereby generating compressed block $CB_r$ as described above. The compressed block $CB_r$ is transmitted to the receiver Rx via the transmission path N.

The receiver Rx subjects the received compressed block $CB_r$ to the processing which has been described in the foregoing embodiment of the invention, thereby generating reproduced image data RTD. Herein, as will be appreciated from the foregoing description, the reproduced image data RTD represents an image of the object TG which is substantially the same as the image represented by the captured image data CTD. The reproduced image data RTD is outputted to the display section 18. The display section 18 subjects the received reproduced image data RTD to display processing, thereby providing an image representing the object TG to an operator.

While checking on the display section 18, the operator operates the control section 19 to instruct as to what sort of action to exert on the object TG. In response to the instruction from the control section 19, the control data generation section 110 generates control data CTLD representing an action to be exerted on the object, which is outputted to the control data sending section 111. The control data sending section 111 sends the received control data CTLD onto the transmission path N, which then is transmitted to the control data receiving section 112. The manipulator section 113 exerts an action on the object TG in accordance with the control data CTLD which is received by the control data receiving section 112.

As described above, in accordance with the transmitter Tx and the receiver Rx, the delay time which is incurred after the generation of captured image data CTD by the image capturing device 17 and before the display processing by the display section 18 can be minimized. By incorporating the transmitters Tx and the receiver Rx having such characteristics in the remote control system $TS_2$, an operator is enabled to grasp the situation concerning the object TG in real time. As a result, the operator can properly act on the object TG from a remote place.

Although the above-described application assumes that the operator operates the control section 19 while looking at the display section 18, it is also possible to automatically control the operation of the robot (or the manipulator section 113) by applying image recognition techniques.

While the invention has been described in detail, the foregoing description is in all aspects illustrative and not restrictive. It is understood that numerous other modifications and variations can be devised without departing from the scope of the invention.

What is claimed is:

1. An image transmitter for compressing image data and transmitting the image data to a receiver via a transmission path, wherein the image data at least contains i pixel values of pixels arranged in line along a single direction, each pixel value being expressed in n bits, the image transmitter comprising:

a blocking section for taking every p pixel values among the i pixel values in the image data to form a data block, and sequentially outputting a plurality of data blocks each including p pixel values;

a data compression section for reducing an amount of data from each data block outputted from the blocking section to output a compressed block for each data block, the data compression section compressing each data block based on a level value derived from a differential pulse code modulation result of two adjoining pixel values; and a data sending section for sending each compressed block outputted from the data compression section onto the transmission path, wherein i, n, and p are predetermined natural numbers, and the data compression section deletes a bit, among all bits of a data block, from each data block based on the level value, wherein the data compression section comprises:

a DPCM encoding section for performing a differential pulse code modulation based on two adjoining pixel values in each data block generated by the blocking section to generate and output differential data;

a near-instantaneous compression section for performing a near-instantaneous compression for the differential data outputted from the DPCM encoding section to reduce a number of bits in the differential data, and generating and outputting compressed differential data; and a packet assembling section for generating and outputting a data packet to the data sending section as the compressed block, the data packet containing a first pixel value in the data block generated by the blocking section and the respective compressed differential data outputted from the near-instantaneous compression section, wherein the DPCM encoding section comprises:

a delay section for applying a predetermined delay amount to $1^{st}$ to $(p-1)^{th}$ pixel values in each data block generated by the blocking section, and outputting delayed pixel values; and a subtraction section for calculating respective differences between 2 to p pixel values in each data block generated by the blocking section and $1^{st}$ to $(p-1)^{th}$ delayed pixel values outputted from the delay section to generate (p−1) differential data as the differential data, and outputting the (p−1) differential data to the near-instantaneous compression section, and wherein the near-instantaneous compression section comprises:

a buffer section for storing the (p−1) differential data outputted from the DPCM encoding section;

a level determination section for generating the level value based on each of the (p−1) differential data outputted from the buffer section and outputting the level value, the level value determining a bit to be deleted from each of the (p−1) differential data; and a data reduction section for deleting the bit, as determined by the level value outputted from the level determination section, from each differential data outputted from the buffer section to generate (p−1) compressed differential data as the compressed differential data, and outputting the (p−1) compressed differential data to the packet assembling section.

2. The image transmitter according to claim 1, wherein:
   the compressed block has a fixed length; and
   the data sending section comprises:

a buffer section for storing the compressed block; and
   a sending control section for sending the compressed block stored in the buffer section onto the transmission path.

3. The image transmitter according to claim 1, wherein the level determination section comprises:

a differential data selection section for selecting one of the respective (p−1) differential data outputted from the buffer section which has a greatest absolute value, and outputting the selected differential data as a maximum differential data; and a level selection section for selecting one of a predetermined number of the level values based on the maximum differential data outputted from the differential data selection section, and outputting the selected level value to the data reduction section.

4. The image transmitter according to claim 3, wherein:
   the data reduction section deletes t bits, as determined by the level value outputted from the level determination section, from each differential data outputted from the buffer section to generate the (p−1) compressed differential data; and
   t is a natural number.

5. The image transmitter according to claim 1, wherein the data packet generated by the packet assembling section contains the first pixel value in each data block generated by the blocking section, the level value outputted from the level determination section, and the (p−1) compressed differential data outputted from the data reduction section.

6. The image transmitter according to claim 1, wherein, when p pixel values among the i pixel values in the image data cannot be taken to form a data block, the blocking section generates a padded data block by using a predetermined padding bit, the padded data block having the same size as that of the data block.

7. A transmission system including the receiver and the image transmitter according to claim 1, wherein the receiver comprises:

a data receiving section for receiving the data packet transmitted via the transmission path and outputting the received data packet;

a packet disassembling section for disassembling the data packet outputted from the data receiving section into the first pixel value in the data block and the respective compressed differential data generated by the near-instantaneous compression section, and outputting the first pixel value in the data block and the respective compressed differential data;

a near-instantaneous decompression section for restoring the bits having been deleted from the compressed differential data generated by the near-instantaneous compression section to generate and output decompressed differential data;

a DPCM decoding section for performing an inverse process of the differential pulse code modulation performed by the DPCM encoding section, generating decoded pixel values from the respective decompressed differential data outputted from the near-instantaneous decompression section, and outputting the decoded pixel values; and an image data reproduction section for generating reproduced image data from the first pixel value outputted from the packet disassembling section and the respective decoded pixel values outputted from the DPCM decoding section, the reproduced image data representing an image.

8. The transmission system according to claim 7, wherein:
the data packet has a fixed length; and
the data receiving section comprises:
   a buffer section capable of storing at least the data packet of the fixed length; and
   a reception control section for outputting the data packet stored in the buffer section to the packet disassembling section.

9. The transmission system according to claim 7, wherein the receiver further comprises:
a missing block recovery section for, when a data packet is missed by the data receiving section, reproducing pixel values contained in the missing data packet based on a first pixel value from at least one other data packet from the packet disassembling section and decoded pixel values from the at least one other data packet from the DPCM decoding section, and outputting the pixel values to the image data reproduction section.

10. A driving assistant system for assisting in the driving of a vehicle, the driving assistant system comprising:
a transmission path;
a plurality of image capturing devices each of which is fixed on the vehicle and which captures an image of surroundings of the vehicle and outputs captured image data;
a plurality of image processing sections each of which is connected to an image capturing device of the image capturing devices and performs a clipping process for the captured image data outputted from the respective image capturing device to generate partial image data, wherein each partial image data at least contains i pixel values of pixels arranged in line along a single direction, each pixel value being expressed in n bits; and
a plurality of transmitters each of which is associated with one of the plurality of image processing sections,
wherein each transmitter comprises:
   a blocking section for taking every p pixel values among the i pixel values in the partial image data from the associated image processing section to form a data block, and sequentially outputting a plurality of data blocks each including p pixel values,
   a data compression section for reducing an amount of data from each data block outputted from the blocking section to output a compressed block for each data block, the data compression section reducing the amount of data based on a level value derived from a different pulse code modulation result of two adjoining pixel values, and
   a data sending section for sending each compressed block outputted from the data compression section onto the transmission path;

a receiver for receiving and decompressing each compressed block from the transmission path, restoring each data block, and reproducing the respective partial image data;

an image synthesis section for performing a synthesis process for the partial image data from the receiver and outputting merged image data, the merged image data representing an image in which images represented by the respective partial image data are synthesized; and a display section for displaying the image represented by the merged image data outputted from the image synthesis section, wherein i, n, and p are predetermined natural numbers, and the data compression section deletes a bit, among all bits of a data block, from each data block based on the level value, wherein the data compression section of each transmitter comprises:
   a DPCM encoding section for performing a differential pulse code modulation based on two adjoining pixel values in each data block generated by the blocking section to generate and output differential data;
   a near-instantaneous compression section for performing a near-instantaneous compression for the differential data outputted from the DPCM encoding section to reduce a number of bits in the differential data, and generating and outputting compressed differential data; and
   a packet assembling section for generating and outputting a data packet to the data sending section as the compressed block, the data packet containing a first pixel value in the data block generated by the blocking section and the respective compressed differential data outputted from the near-instantaneous compression section, wherein the DPCM encoding section of each transmitter comprises:
   a delay section for applying a predetermined delay amount to $1^{st}$ to $(p-1)^{th}$ pixel values in each data block generated by the blocking section, and outputting delayed pixel values; and
   a subtraction section for calculating respective differences between $2^{nd}$ to $p^{th}$ pixel values in each data block generated by the blocking section and $1^{st}$ to $(p-1)^{th}$ delayed pixel values outputted from the delay section to generate (p–1) differential data as the differential data, and outputting the (p–1) differential data to the near-instantaneous compression section, and wherein the near-instantaneous compression section of each transmitter comprises:
   a buffer section for storing the (p–1) differential data outputted from the DPCM encoding section;
   a level determination section for generating the level value based on each of the (p–1) differential data outputted from the buffer section and outputting the level value, the level value determining a bit to be deleted from each of the (p–1) differential data; and
   a data reduction section for deleting the bit, as determined by the level value outputted from the level determination section, from each differential data outputted from the buffer section to generate (p–1) compressed differential data as the compressed differential data, and outputting the (p–1) compressed differential data to the packet assembling section.

11. A remote control system for exerting an action on an object via remote control, the remote control system comprising:
- a transmission path;
- an image capturing device which is provided in a neighborhood of the object and captures an image of surroundings of the object and outputs captured image data, wherein the captured image data at least contains i pixel values of pixels arranged in line along a single direction, each pixel value being expressed in n bits; and
- a transmitter,
- wherein the transmitter comprises:
  - a blocking section for taking every p pixel values among the i pixel values in the captured image data from the image capturing device to form a data block, and sequentially outputting a plurality of data blocks each including p pixel values;
  - a data compression section for reducing an amount of data from each data block outputted from the blocking section to output a compressed block for each data block, the data compression section reducing the amount of data based on a level value derived from a differential pulse code modulation result of two adjoining pixel values, and
  - a data sending section for sending each compressed block outputted from the data compression section onto the transmission path;
- a receiver for receiving and decompressing each compressed block from the transmission path, restoring each data block, and reproducing the captured image data;
- a display section for displaying the image represented by the captured image data outputted from the receiver for viewing by an operator;
- a control data generation section for generating and outputting control data for exerting an action on the object in accordance with control made by the operator; and
- a control data sending section for sending control data from the control data generation section onto the transmission path;
- a control data receiving section for receiving and outputting the control data from the transmission path; and
- a manipulator section for exerting the action on the object in accordance with the control data received from the control data receiving section,
- wherein i, n, and p are predetermined natural numbers, and the data compression section deletes a bit, among all bits of a data block, from each data block based on the level value,
- wherein the data compression section comprises:
  - a DPCM encoding section for performing a differential pulse code modtilation based on two adjoining pixel values in each data block generated by the blocking section to generate and output differential data;
  - a near-instantaneous compression section for performing a near-instantaneous compression for the differential data outputted from the DPCM encoding section to reduce a number of bits in the differential data, and generating and outputting compressed differential data; and
  - a packet assembling section for generating and outputting a data packet to the data sending section as the compressed block, the data packet containing a first pixel value in the data block generated by the blocking section and the respective compressed differential data outputted from the near-instantaneous compression section,
- wherein the DPCM encoding section comprises:
  - a delay section for applying a predetermined delay amount $1^{st}$ to $(p-1)^{th}$ pixel values in each data block generated by the blocking section, and outputting delayed pixel values; and
  - a subtraction section for calculating respective differences between $2^{nd}$ to $p^{th}$ pixel values in each data block generated by the blocking section and $1^{st}$ to $(p-1)^{th}$ delayed pixel values outputted from the delay section to generate (p−1) differential data as the differential data, and outputting the (p−1) differential data to the near-instantaneous compression section, and
- wherein the near-instantaneous compression section comprises:
  - a buffer section for storing the (p−1) differential data outputted from the DPCM encoding section;
  - a level determination section for generating the level value based on each of the (p−1) differential data outputted from the buffer section and outputting the level value, the level value determining a bit to be deleted from each of the (p−1) differential data; and
  - a data reduction section for deleting the bit, as detennined by the level value outputted from the level determination section, from each differential data otitputted from the buffer section to generate (p−1) compressed differential data as the compressed differential data, and outputling the (p−1) compressed differential data to the packet assembling section.

12. An image compression and transmission method for compressing image data and transmitting the image data to a receiver via a transmission path,
- wherein the image data at least contains i pixel values of pixels arranged in line along a single direction, each pixel value being expressed in n bits, the image compression and transmission method comprising:
  - a blocking operation of taking every p pixel values among the i pixel values in the image data to form a data block, and sequentially outputting a plurality of data blocks each including p pixel values;
  - a data compression operation of reducing an amount of data from each data block outputted in the blocking operation to output a compressed block for each data block based on a level value derived from a differential pulse code modulation result of two adjoining pixel values; and
- sending each compressed block outputted in the data compression operation onto the transmission path,
- wherein i, n, and p are predetermined natural numbers, and the data compression operation deletes a bit, among all bits of a data block, from each data block based on the level value,
- wherein the data compression operation comprises:
  - a DPCM encoding operation of performing a differential pulse code modulation based on two adjoining pixel values in each data block generated by the blocking operation to generate and output differential data;
  - a near-instantaneous compression operation of performing a near-instantaneous compression for the differential data outputted by the DPCM encoding operation to reduce a number of bits in the differential data, and generating and outputting compressed differential data; and a packet assembling operation of generating and outputting a data packet for the sending operation as the compressed block, the data packet containing a first pixel value in the data block generated by the blocking operation and the respective compressed differential data outputted by the near-instantaneous compression operation, wherein the DPCM encoding operation comprises:

a delay operation of applying a predetermined delay amount to $1^{st}$ to $(p-1)^{th}$ pixel values in each data block generated by the blocking operation, and outputting delayed pixel values; and a subtraction operation of calculating respective differences between $2^{nd}$ to $p^{th}$ pixel values in each data block generated by the blocking operation and $1^{st}$ to $(p-1)^{th}$ delayed pixel values outputted by the delay operation to generate (p−1) differential data as the differential data, and outputting the (p−1) differential data for the near-instantaneous compression operation, and wherein the near-instantaneous compression operation comprises:

a buffer operation of storing the (p−1) differential data outputted by the DPCM encoding operation;

a level determination operation of generating the level value based on each of the (p−1) differential data outputted by the buffer operation and outputting the level value, the level value determining a bit to be deleted from each of the (p−1) differential data; and a data reduction operation of deleting the bit, as determined by the level value outputted by the level determination operation from each differential data outputted by the buffer operation to generate (p−1) compressed differential data as the compressed differential data, and outputting the (p−1) compressed differential data for the packet assembling operation.

* * * * *

UNITED STATES PATENT AND TRADEMARK OFFICE
CERTIFICATE OF CORRECTION

PATENT NO. : 7,031,386 B2
APPLICATION NO. : 09/953974
DATED : April 18, 2006
INVENTOR(S) : Akihiro Yamamoto et al.

It is certified that error appears in the above-identified patent and that said Letters Patent is hereby corrected as shown below:

In column 25, line 59, please replace "2 to p pixel" with --$2^{nd}$ to $p^{th}$ pixel--.
In column 28, lines 61-62, please replace "detenriined" with --determined--.
In column 29, line 55, please replace "modtilation" with --modulation--.
In column 30, line 6, please replace "amount $1^{st}$" with --amount to $1^{st}$--.
In column 30, line 29, please replace "otitputted" with --outputted--.
In column 30, line 31, please replace "outputling" with --outputting--.
In column 32, line 11, please replace "outpuffed" with --outputted--.

Signed and Sealed this

Twenty-second Day of August, 2006

JON W. DUDAS
*Director of the United States Patent and Trademark Office*